June 23, 1970 A. MAURIN 3,516,917

CATHODE PROTECTION DEVICE

Filed Sept. 12, 1966 17 Sheets-Sheet 7

June 23, 1970 A. MAURIN 3,516,917

CATHODE PROTECTION DEVICE

Filed Sept. 12, 1966 17 Sheets-Sheet 11

June 23, 1970 A. MAURIN 3,516,917

CATHODE PROTECTION DEVICE

Filed Sept. 12, 1966 17 Sheets-Sheet 15

3,516,917
CATHODE PROTECTION DEVICE

Alexandre Maurin, 16 Rue de Varize, Paris 16°, France

Filed Sept. 12, 1966, Ser. No. 578,817
Claims priority, application France, Sept. 11, 1965, 1,462,276; Nov. 16, 1965, 89,053; Dec. 15, 1965, 89,491
Int. Cl. C23f *13/00*
U.S. Cl. 204—196 14 Claims

ABSTRACT OF THE DISCLOSURE

A cathode protection device for an immersed structure which is characterized in that it comprises a series of elementary protection D.C. sources fed in parallel from a single current source, in that each elementary current source is located within a water-tight immersed enclosure, the outer wall of the enclosure acting as or carrying a current outlet, and that said enclosure comprises two current lead-ins, one for the wires feeding the current source and the other for permitting the negative connection for protecting the structure, this other lead-in being therefore connected thereto.

The present invention relates to a specific cathode protection device specially designed for protecting immersed metallic structures.

The essential purpose of a cathode protection system is to reduce through the boundary water/metal layer the potential $-\Delta V$ volts, $$-\Delta V=R.i$$

wherein R is the ohmic resistance to the passage of the protection current capable of protecting the unitary surface of the structure against corrosion, and $i$ is under the same conditions the strength of the D.C. protection current accepted by the same unitary surface of the protected structure; in fact, $i$ is a current density (AMP/surface area).

A cathode protection can be obtained by applying two methods of emitting in a water medium the protection current capable of making the immersed metallic surface "corrosion-proof."

In the so-called "reactive anode" technique, blocks of metal such as zinc, magnesium or aluminium alloy are connected to the structure to be protected so as to constitute two terminals of a voltaic pile of which the negative pole (−) is the reactive anode which wears as it emits the protection current, the positive terminal (+) being the cathode of the assembly or structure to be protected, this cathode collecting the emitted current resulting from the corrosion of the reactive anodes.

In the case of a so-called "current tapping" system the immersed metallic structure or a non-metallic but conducting structure termed the "discharge member" is connected to the positive (+) terminal of a source of direct current having its negative terminal (−) connected to the structure to be protected against corrosion.

The discharge member (the anode in this system) emits the protection current accepted (or tapped) by the structure to be protected against corrosion, which is the cathode of the system.

The discharge member may be made of a material practically insensitive to anode corrosion, or a soluble material for these specific service conditions. On the other hand, *in all cases,* the cathode metallic structure is safely protected from corrosion effects provided that it accepts the protection current having the minimum density:

$$i_0=\Delta V_0/R$$

This current density is exactly the one ensuring the effective cathode polarization" of the structure to be protected from corrosion effects.

The method described hereinafter is of the so-called "current tapping" type.

It is well known that if from a single discharge or outlet member disposed in the vicinity of the origin of a relatively long structure such as immersed piping a protection current capable of providing the above-defined protection density $i_0$ is emitted, at the opposite end of this piping the protection current is designated as follows:

$$I_{amp}=a/r\cdot\Delta V_0\cdot shal$$

R being the unitary resistance in ohm/meter of the insulation between the piping and water (unitary resistance of the boundary layer);

$r$=longitudinal resistance in ohms/meter of the piping metal, $a=(r/R)^{1/2}$ $l$=length of the piping or like structure in meters, $\Delta V_0$=the voltage drop in volts measured at the structure and remotest from the discharge or output member.

Let ΔV (volts) be the voltage drop measured in the structure in the vicinity of the discharge member, thus:

$$\Delta V \text{ volts}=\Delta V_0\cdot chal$$

The two terms given hereinabove are approaching expressions sufficient however for all practical purposes.

From the form of the expressions to be used for calculating immersed structures it will be readily understood that to reduce the terms I and ΔV to their minimum values the source of protection current should be divided into $n$ elementary D.C. sources distributed along the structure, each sub-source having its pertinent outlet or discharge. Each source will thus protect only a length fraction $l/n$ of the piping.

Thus, the current fed through the system is $n.I'$, wherein I' is the current delivered by each unitary current source, is always less than I and the mean value ΔV' obtained along the entire system will always be lower than ΔV and may at the limit equal $\Delta V_0$.

The higher $n$, the more pronounced the difference $I-I'$.

For each specific case contemplated (R, $l$, $r$) an economical study must be made in order to ascertain the optimal value of $n$ leading to the most advantageous solution.

The specific form of embodiment of the cathode protection device which is described hereinafter is based on the above remarks; in brief, a relatively great number of separate protection units of the so-called "current tapping" type are used throughout the length of an immersed structure.

More particularly, this invention is concerned with a cathode protection device for an immersed structure which is characterized in that it comprises a series of elementary protection D.C. sources fed in parallel from a single current source, in that each elementary current source is located within a water-tight buoy or enclosure. The outer wall of the enclosure acts as or carries a current outlet, and the buoy or enclosure comprises two current lead-ins, one for the wires feeding the current source and the other for permitting the negative connection for protecting the structure, this other lead-in is therefore connected thereto.

According to a specific form of embodiment of this invention the local current source is incorporated in the structure proper, notably in the case of immersed piping. The efficiency of the protection device according to this invention is subordinate to the fluid-tightness of the lead-in and lead-out passages. Although this problem is not particularly difficult in the case of the conductors connecting the outlet or discharge member to the immersed structure, due to the low voltage, of the order of 5 to 6 volts, between the positive wire and the ground, the same does not apply to alternating-current conductors due to the relatively high voltage (380 to 1,500 volts) existing between these conductors.

This invention is also concerned with a cathode protection device for immersed structures which comprises a series of elementary protection D.C. sources, fed in parallel from a single mains current source, each elementary current source being housed in a water-tight enclosure consisting either of the body of a buoy constituting or carrying the current discharge or outlet element electrically connected to the immersed structure, or of a casing or sleeve secured in a fluid-tight manner to one portion or section of the immersed structure. This device is characterized in that each A.C. conductor passes through the wall of the enclosure within a tube open at either end and welded in a fluid-tight manner to said wall, and that at least one current transformer connected to a transformer-rectifier unit constituting the elementary D.C. source is mounted externally of each tube, that is, within the enclosure.

Furthermore, this invention is concerned with a cathode protection device for immersed structures, which comprises a series of elementary sources of protection direct current fed in parallel from a single current source, each elementary source being housed within a fluid-tight enclosure in which tubes extending from end to end are fitted and receive the A.C. conductors. This device is characterized in that one of the A.C. supply conductors forms one or a plurality of coil turns along its path within a pair of parallel tubes and that at least one of the tubes carries within the enclosure a current transformer connected to a rectifier.

With this arrangement the number of amperes-turns of the primary alternating current is increased and thus the number of current transformers (coiled magnetic tores) necessary for producing the secondary alternating current to be subsequently rectified can be reduced.

According to another feature characterizing this invention, transformer relay cells are interposed in the protection line and in these cells the feed conductors are coiled to constitute the windings of a connecting transformer.

In order to afford a clearer understanding of this invention, various forms of embodiment thereof will now be described with reference to the accompanying drawings, in which.

Figures 1, 2:
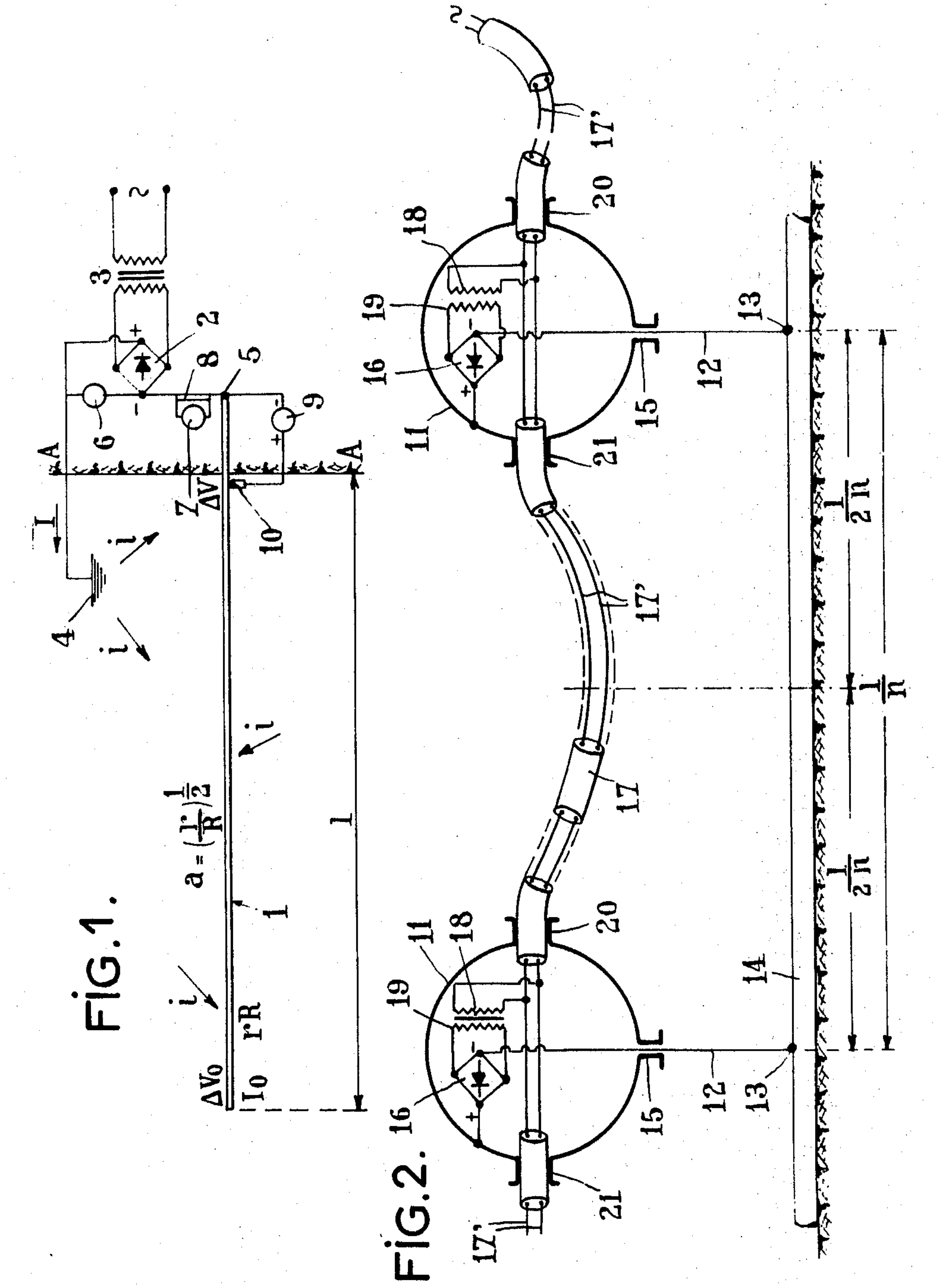
FIG. 1 illustrates by way of general reminder the principle of current-tapping systems utilizing a single discharge or outlet member.
FIG. 2 illustrates diagrammatically a device constructed according to the general principle of this invention, wherein the negative terminals (−) of the elementary current sources are connected in parallel through the piping to be protected.
Figure 9:
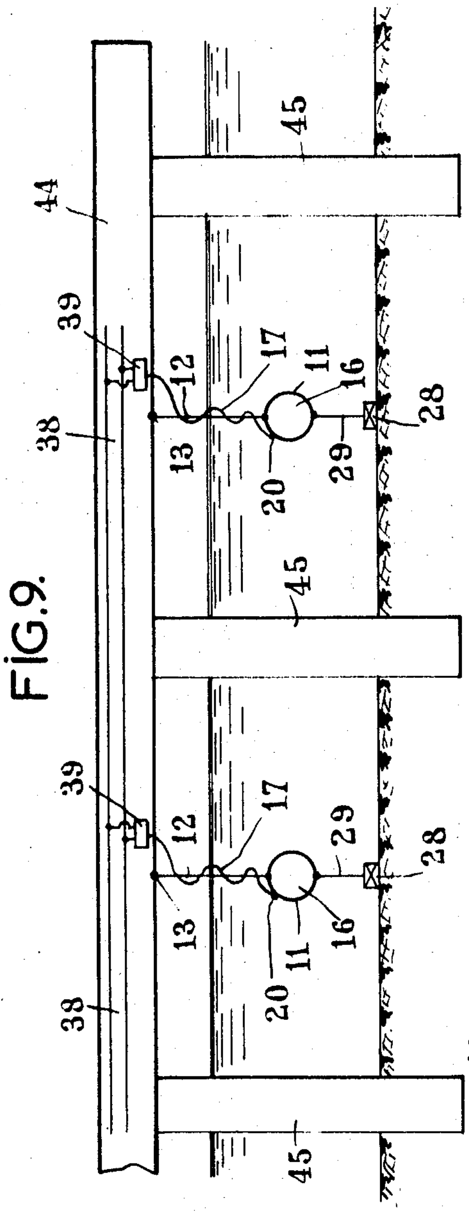
Figure 9A:
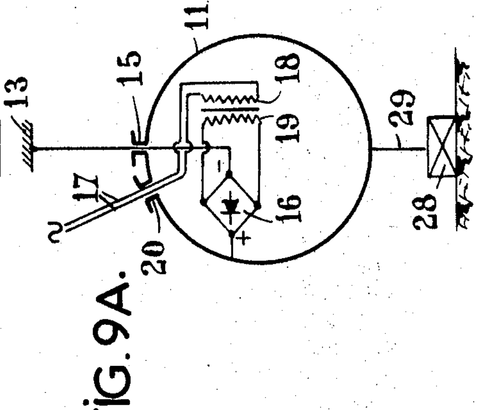
Figure 9B:
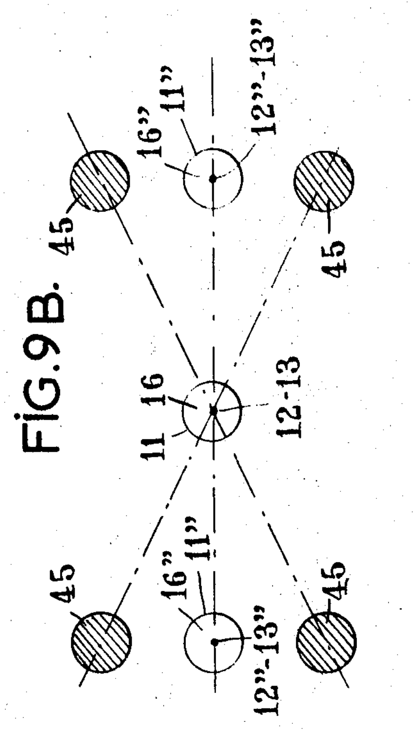
Figures 10A, 10B, 10C, 10D, 11:
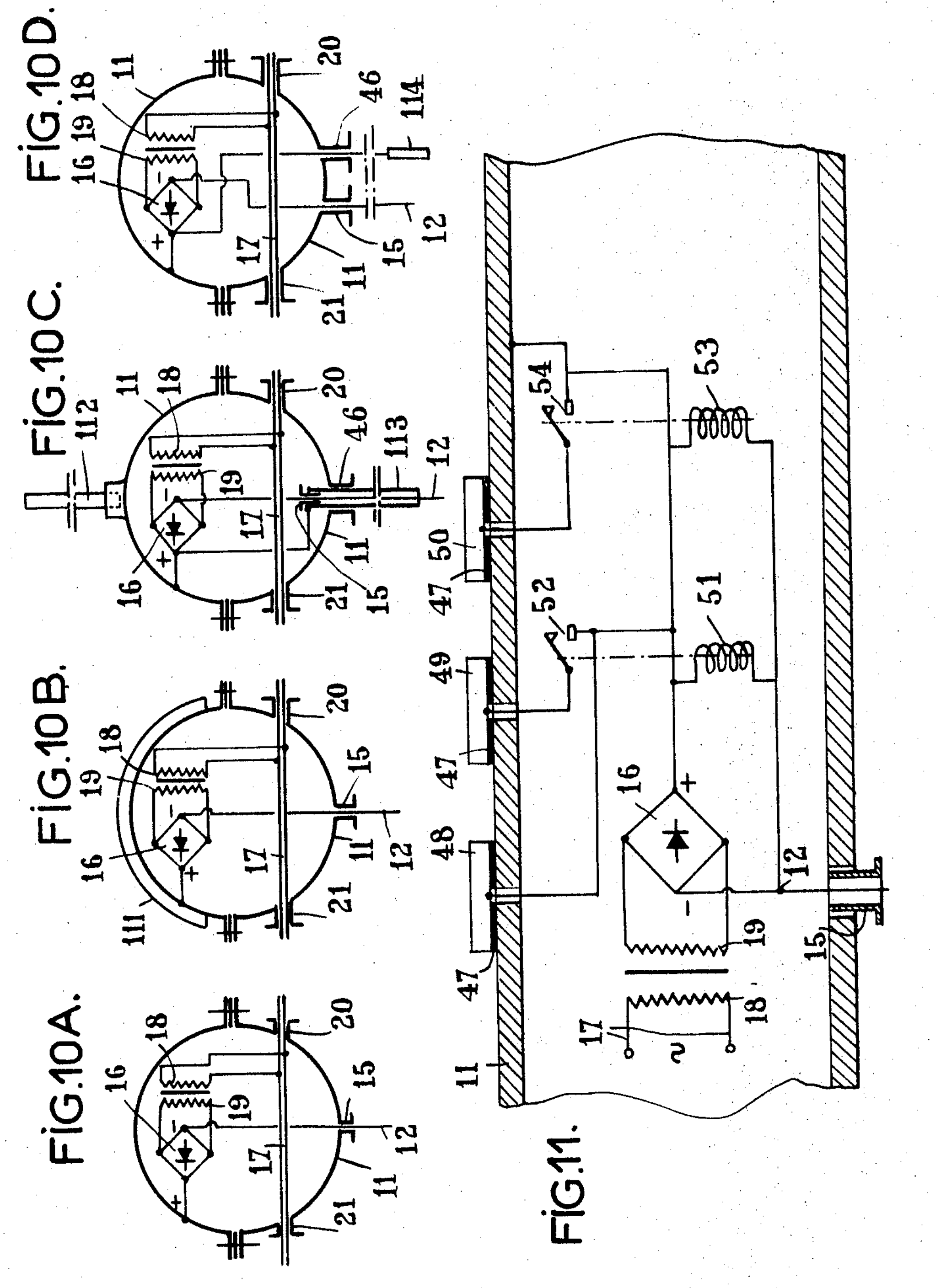
Figure 13:
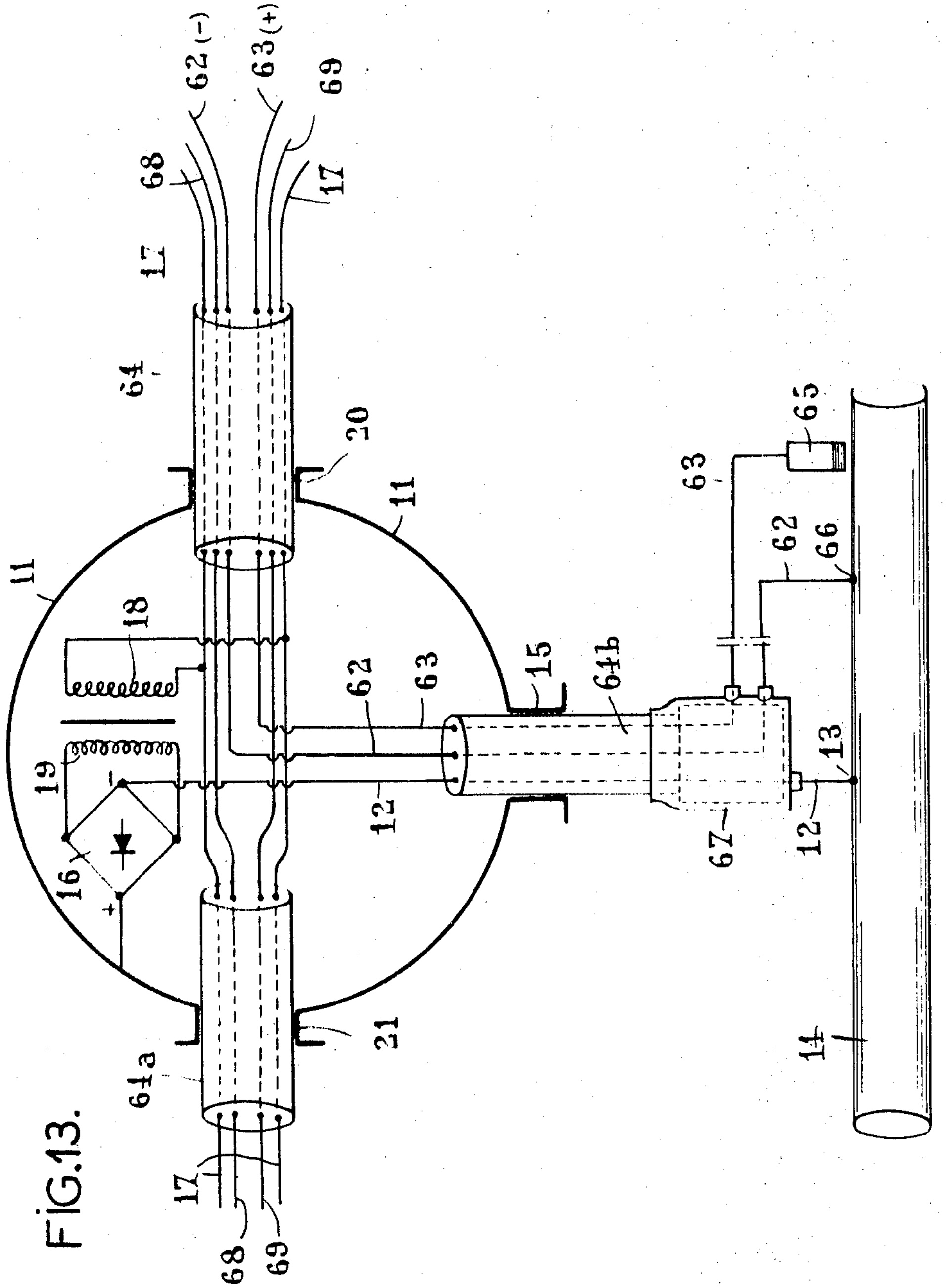
Figure 14:
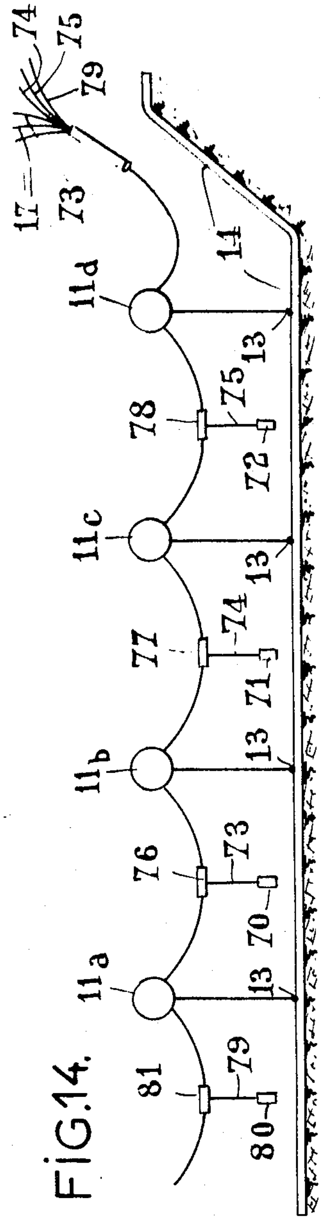
Figure 15:
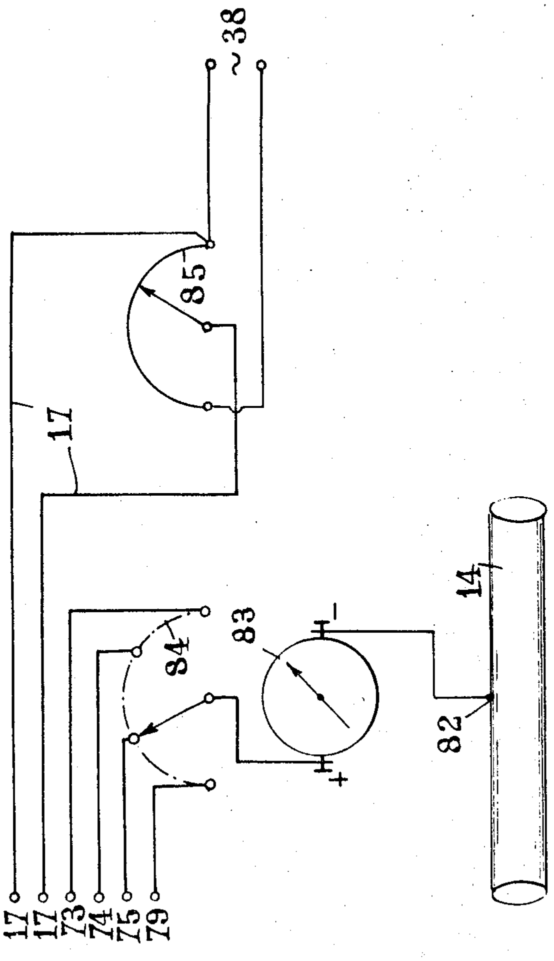
Figure 16:
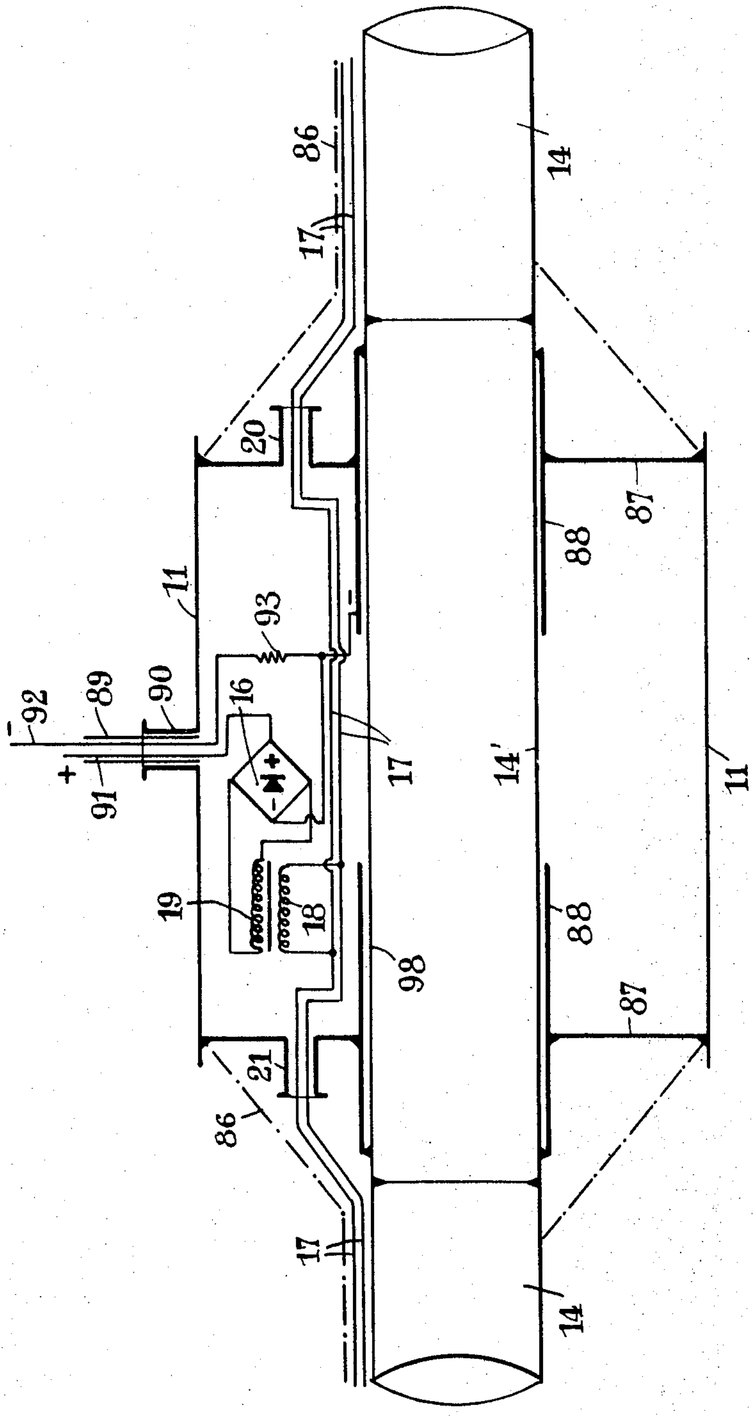
Figure 17:
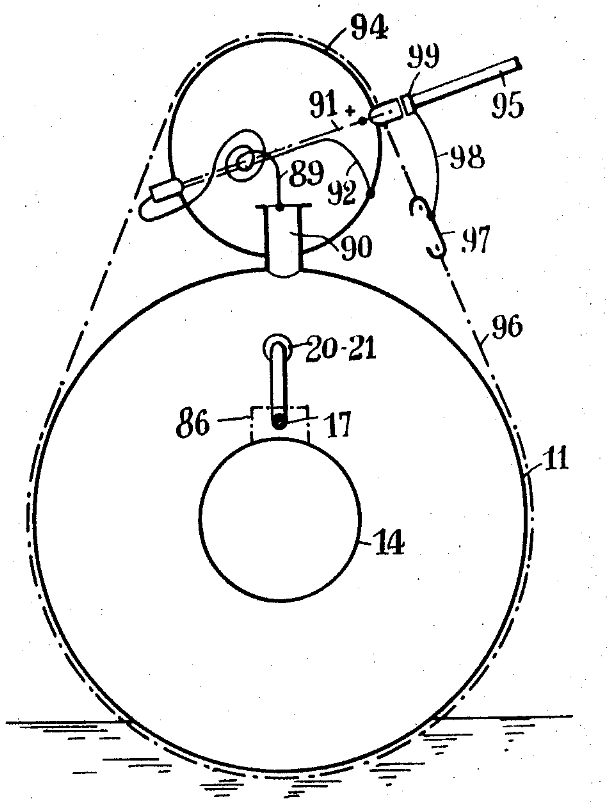
Figure 18:
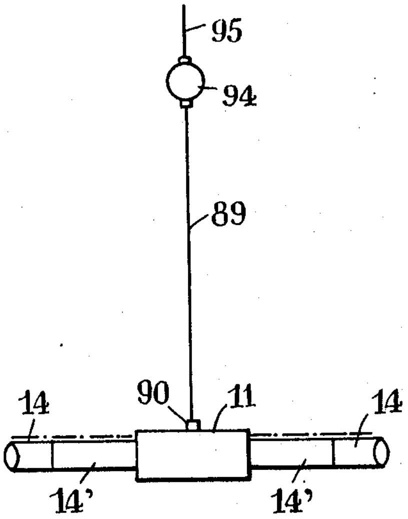
Figure 20:
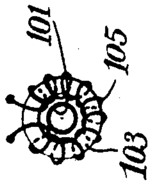
Figure 19:
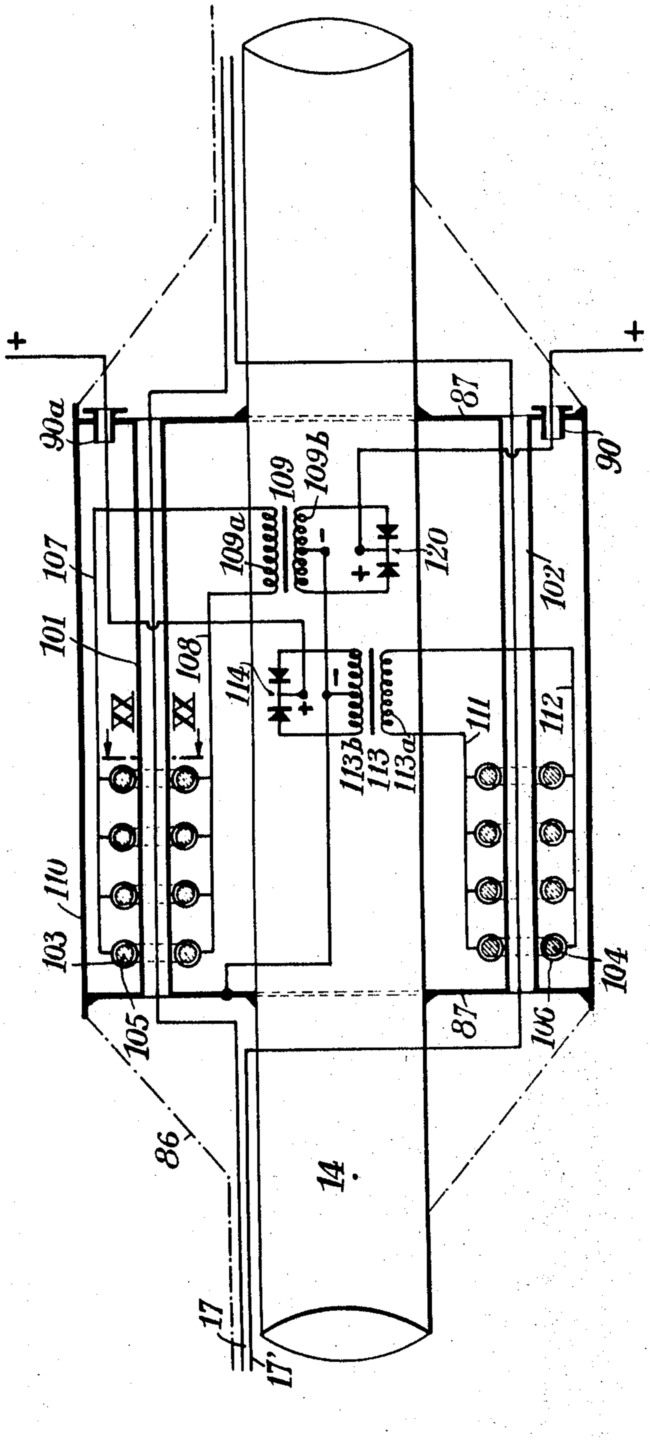
Figure 21:
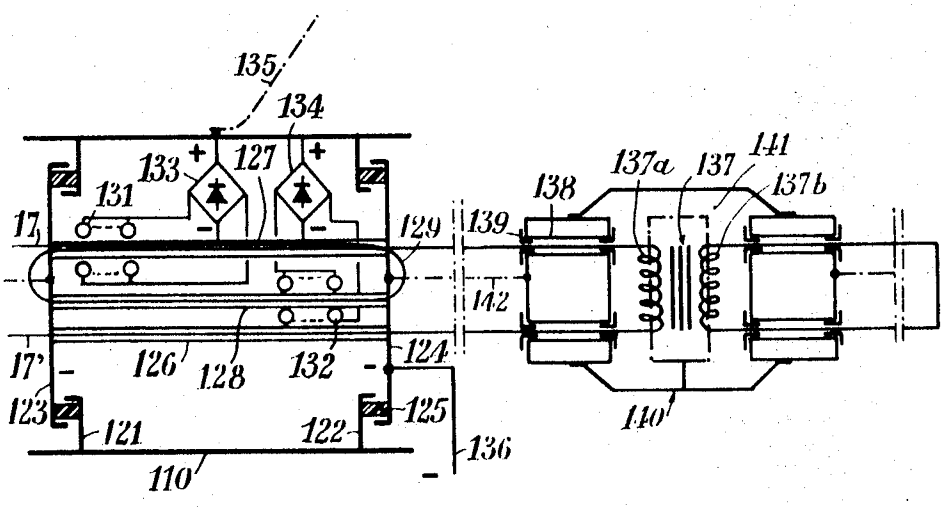
Figure 22:
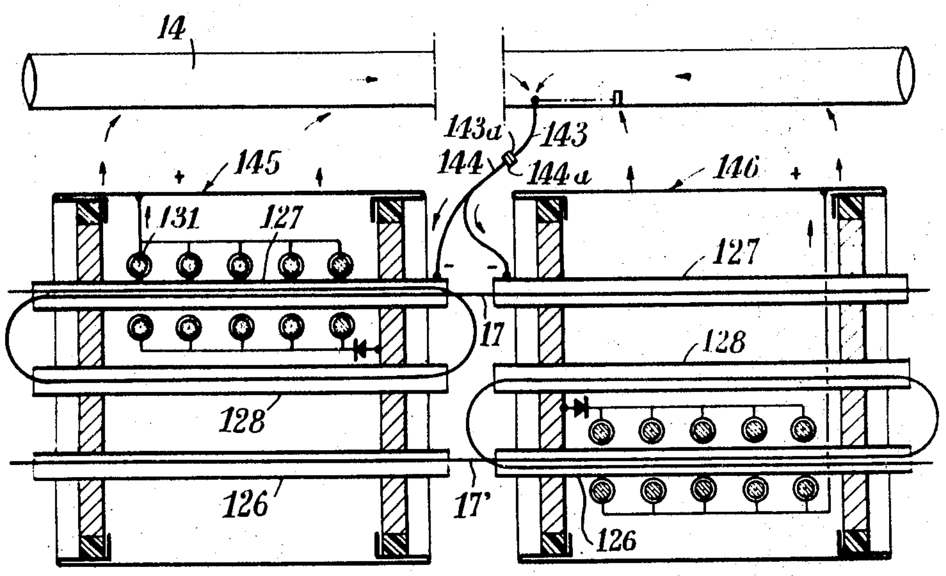
Figure 23:
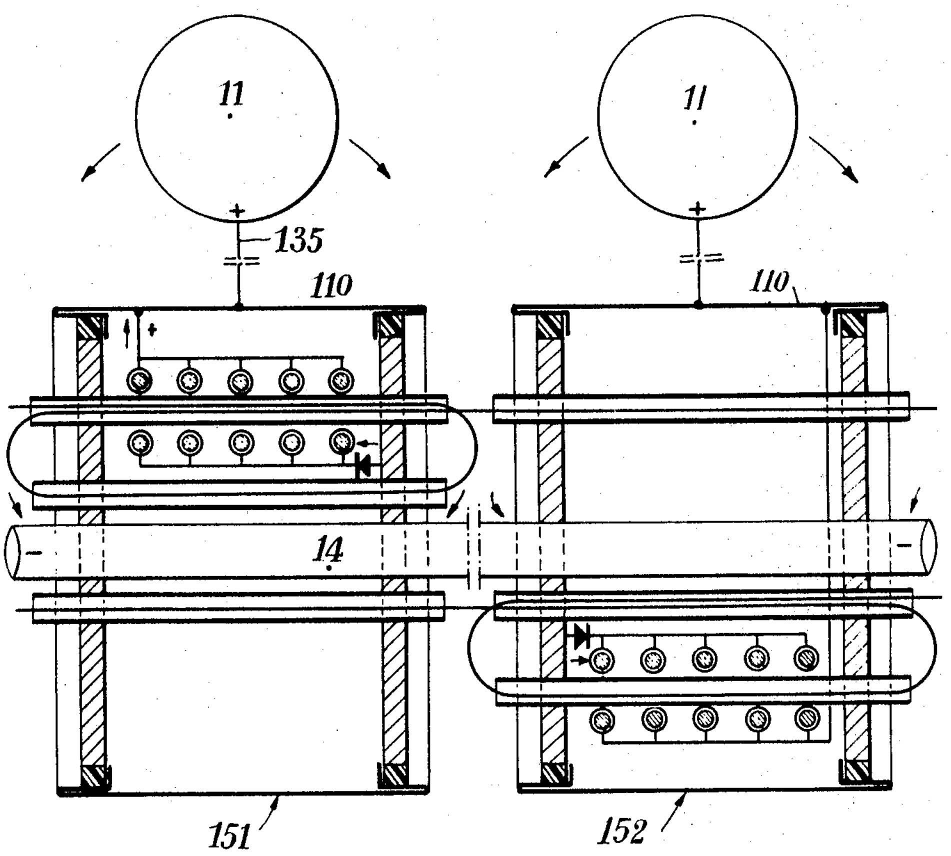
Figure 24:
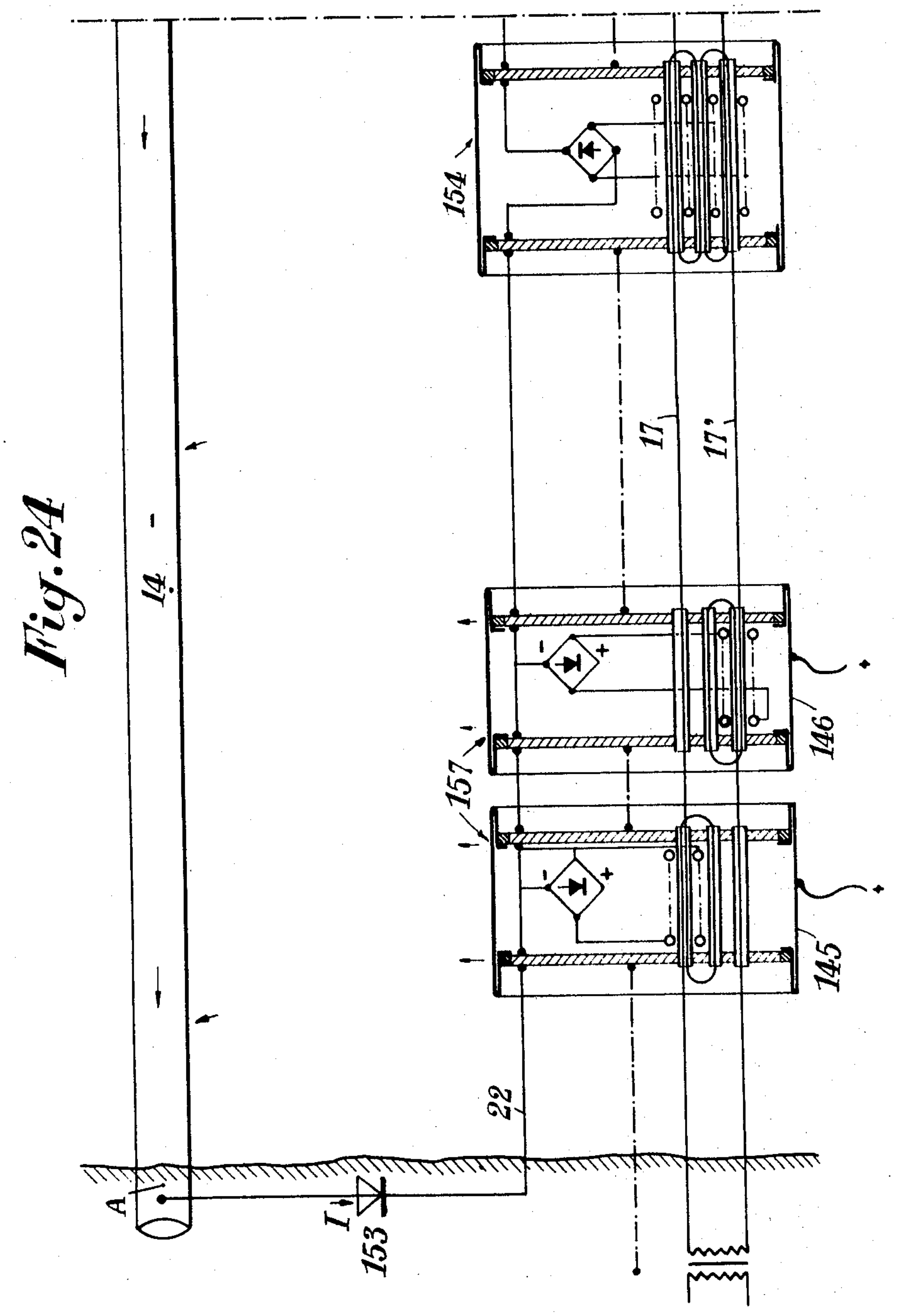
Figure 24A:
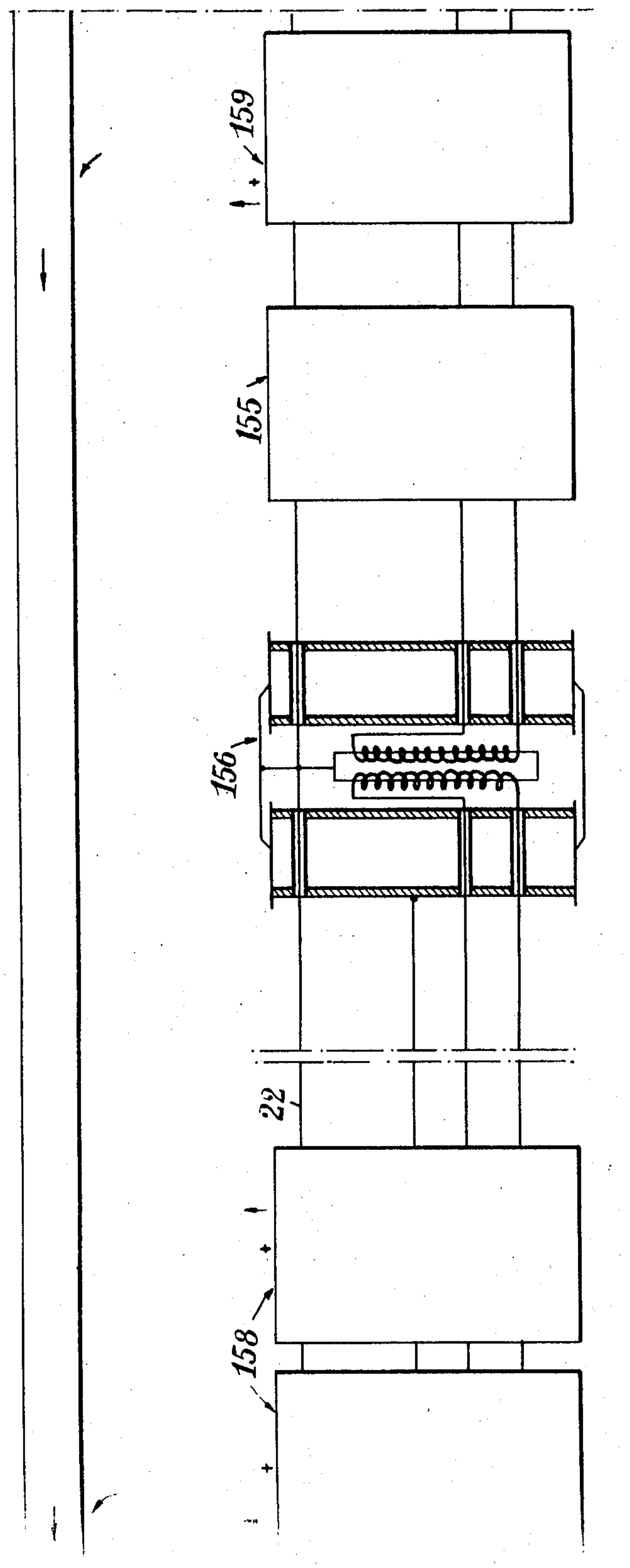

FIGS. 9, 9A and 9B relate to the cathode protection using a buoy system, wherein each buoy constitutes a source of current for protecting a structure such as a pier supported by metal beams;

FIGS. 10A, 10B, 10C and 10D relate to the specific application of the cathode protection by means of buoys, wherein each buoy constitutes by itself the discharge or outlet member, or a simple support for the discharge member while enclosing the elementary source of protection current;

FIG. 11 illustrates a modified form of embodiment of the solutions shown in FIGS. 10A, 10B, 10C and 10D;

FIGS. 12A, 12B, 12C, 12D, 12E and 12F show constructions wherein the discharge or outlet member, when initially starting the system, acts both as a buoy utilized during the laying operations and as a fluid-tight enclosure containing the source of direct current; both discharge or outlet members are electrically interconnected; in this system, the laying buoy made of steel will disappear by corrosion and after a certain time of operation the conditions shown in FIG. 2 are restored;

FIG. 13 is a diagram illustrating the possibility of completing the general arrangements of this invention by means of a remote-measuring device;

FIGS. 14 and 15 are diagrams concerned with specific forms of embodiment of the above-mentioned remote-measuring device and also with the specific use of these remote measurements;

FIGS. 16, 17 and 18 show a modified form of embodiment of an immersed piping having a built-in current source;

FIG. 19 is a diagram showing a direct-current source housed in a fluid-tight enclosure incorporated in the immersed structure;

FIG. 20 is a fragmentary cross-sectional view taken upon the line XX—XX of FIG. 19 and illustrates the arrangement of a current transformer;

FIG. 21 is a fragmentary diagram showing a cathode protection line comprising a protection cell containing an elementary direct-current source and a transformation relay cell;

FIG. 22 is a fragmentary diagram showing a cathode protection line associated with a piping of mean length and immersed at a relatively moderate depth;

FIG. 23 is a fragmentary diagram showing a cathode protection line associated with a relatively long piping immersed at a relatively great depth;

FIGS. 24 and 24A assembled along the transverse line *a–b* constitute a fragmentary diagram showing a cathode protection line associated with a piping of relatively reduced length but immersed at a relatively great depth.

Referring first to FIG. 1 showing diagrammatically a conventional cathode protection device by current tapping applicable for instance to a piping system immersed in the sea, the welded steel piping is immersed along a length of "$l$" meters and is characterized by the data $r$ and R, $r$ being the longitudinal resistance of the piping in ohms.m., as a function of the diameter and thickness of the tube constituting the piping, R depending on the insulation between the metal and the water, which is obtained by properly lining the metal with adequate material.

To ensure a cathode protection of the piping 1 a source of direct current is provided on the shore, which is shown diagrammatically and by way of example in the form of a single-phase rectifier 2 fed from a transformer 3 having its primary connected to the mains and its secondary adapted to feed the rectifying cells. The positive terminal (+) of the system is connected to a discharge or output member 4 immersed and adapted to emit the current produced by the source. The negative terminal (−) of the system is connected to the piping 1 and "taps" at 5 throughout the immersed length the current emitted by the discharge member 4.

The rectifier comprises a voltmeter 6 providing a voltage:

$$U=\Delta V+V$$

The term V includes the voltage drop in the conductors, the discharge member, the sea and soil media.

An ammeter 7 provided with a bridge 8 measures the tapped current:

$$I_{\text{amp}}=a/r.\Delta V_0 shal$$

The voltage reduction is:

$$\Delta V=\Delta V_0.chal$$

ΔV is measured directly by the voltmeter 9 connected to the pipe at 5 through its negative terminal (−) and to a reference electrode 10 through its positive terminal (+), said electrode being located as close as possible to the pipe and landing ends or shores AA.

The distance between the discharge member 4 of pipe 1 on the one hand, and shores AA on the other hand are as long as possible to prevent the value Δ V from being altered by the electric field existing about the discharge member.

In FIG. 2, there is shown diagrammatically by way of example a first form of embodiment of a cathode protection device constituting the subject-matter of this invention, which is applicable to an immersed piping. In this device the negative terminals (−) of the elementary sources of protection current are connected in parallel by the piping proper.

In FIG. 2 the elementary sources of protection current consist of spherical enclosure made as buoys, this shape being given by way of example, since any other shapes and materials may be contemplated for making these enclosures or buoys.

These buoys or enclosures are shown as floating submerged and this description is also given by way of example, the buoy or enclosure being also adapted to either rest on the sea bottom or act as partially immersed buoys.

Each water-tight buoy 11 is fastened to the piping by means of a cable or wire rope 12 consisting of an insulated or bare electrical conductor connected by welding as at 13 or through any equivalent means to the piping 14.

The conductor 12 penetrates into the buoy 11 through a gland-packing 15 and is connected inside the buoy to the negative terminal (−) of a rectifier 1. This single-phase rectifier 16 is shown by way of example as a typical source of direct current. Actually, the D.C. source may be a rectifier fed with three-phase current or any other equivalent device.

The positive terminal (+) of the rectifier is connected directly to the metal buoy 11 consisting either of an aluminium-titanium alloy which is capable of emitting anodic current indefinitely, without any appreciable wear, this direct current being fed to the sea water and therefore to the piping to be protected (cathode of the system) at a density of 1.5 to 3 A./m.$^2$, or of titanium or a fully or partially platinized metal capable of emitting up to 500 or 700 A./m.$^2$ under the same time conditions.

Thus, a series of elementary sources of direct current is formed, each D.C. source being fed with alternating current through an insulated conductor 17 leading from the shore. In the exemplary structure illustrated this conductor feeds single-phase current and is therefore a two-wire conductor 17, 17'.

In each buoy 11 the conductor 17 feeds the primary 18 of a transformer having its secondary 19 connected across the terminals of the rectifying bridge 16. The feed conductor 17 penetrates into each buoy 11 through a gland-packing 20 and emerges therefrom through another gland-packing 21.

Each buoy 11 may constitute a junction box for the feed conductors 17, but junction boxes may also be provided along the conductors 17 themselves intermediate the buoys 11 if the relative spacing of the D.C. sources is too great.

In the device described herein which comprises $n$ buoys disposed at spaced intrevals along the length "$l$" of the immersed piping, the relative spacing of two adjacent buoys is $l/n$ meters of piping, by reason of ½$n$ meters, on either side of connection 33.

Figure 3:
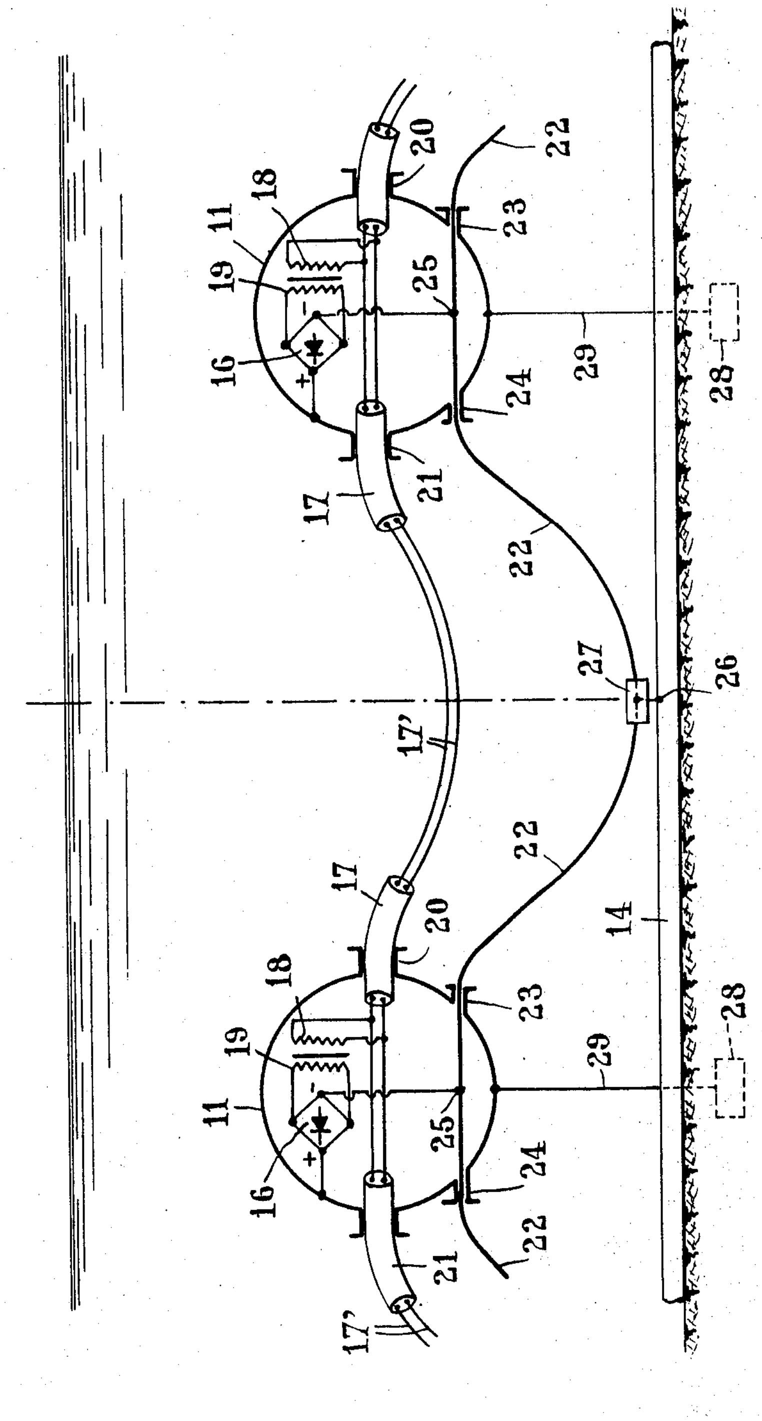
FIG. 3 illustrates diagrammatically a device according to this invention wherein the negative terminals (−) of the elementary current sources are constructed in parallel both by the piping to be protected and by a so-called "negative long line" conductor.

IN FIG. 3, the component elements of FIG. 2 are reproduced as such, i..e: buoy 11, D.C. source 16, transformer 18/19, gland-packing 20–21 for the feed conductor 17.

In FIG. 3, the negative terminals of the elementary D.C. sources 16 are connected in parallel both through the piping 14 and through an insulated or bare conductor 22 penetrating into the buoy and issuing therefrom through gland-packings 23 and 24 respectively. The negative terminal of each separate D.C. source 16 is connected at 25 to the negative conductor 22 also termed "negative long line."

The buoy 11 may constitute as for the conductor 17 a junction box for conductors 22, but these may comprise if desired intermediate junction boxes disposed in the interval between pairs of adjacent buoys.

More particularly, the cable 22 is connected by welding or through any other suitable means, at one or several points 26, to the piping 14, in the interval between two adjacent buoys. To this end it may be convenient to use a gland-packing junction box 27 for effecting this connection 26.

Considering the general arrangement of the system (floating buoys, given by way of example), mushroom-anchors 28 are provided for holding the buoys in position by means of a rope 29 either non-conducting or insulated from the buoy 11.

As an alternative, the rope 29 may be replaced by a negative connection of the type shown at 12 in FIG. 2. In this case, the negative connections between the sources 16 and the piping 14 are: 26, as shown in FIG. 3, and 13, as shown in FIG. 2. This solution is illustrated in FIG. 4.

Figure 4:
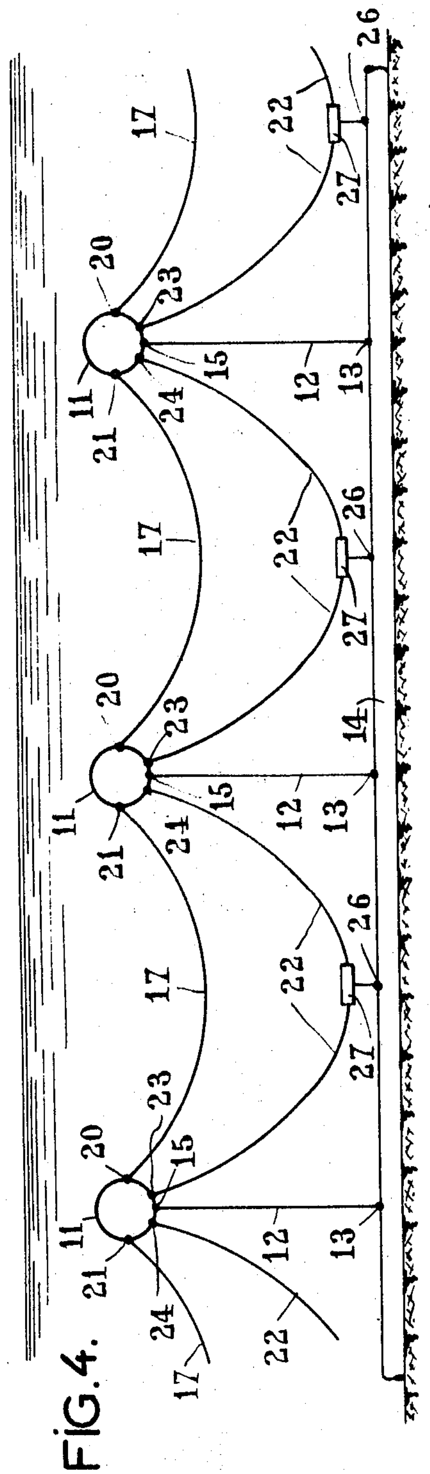
FIG. 4 illustrates diagrammatically a device according to this invention wherein the negative terminals (−) of the elementary current sources are connected in parallel by combining the connections of FIG. 2 with those of FIG. 3.

In FIG. 4, the preceding elements are also shown, namely: the buoy 11, negative conductor 12, connection 13, cable 17, piping 14, gland-packings 15, 20, 21, 23, 24 and long negative line 22.

Thus, the component elements of FIGS. 2 and 3 are also found in FIG. 4.

In the buoys 11 the D.C. sources 16 are connected in parallel through their negative terminals by means of connections 12–13, negative long line 22, connection 26 and also by the possible use of a junction box 27.

The assembly is still energized through a conductor 17.

In the specific mounting shown diagrammatically in FIG. 4 the negative connections 26 may be multiplied between two adjacent buoys 11 in order to improve the efficiency of the cathode protection, if need be.

Figure 5:
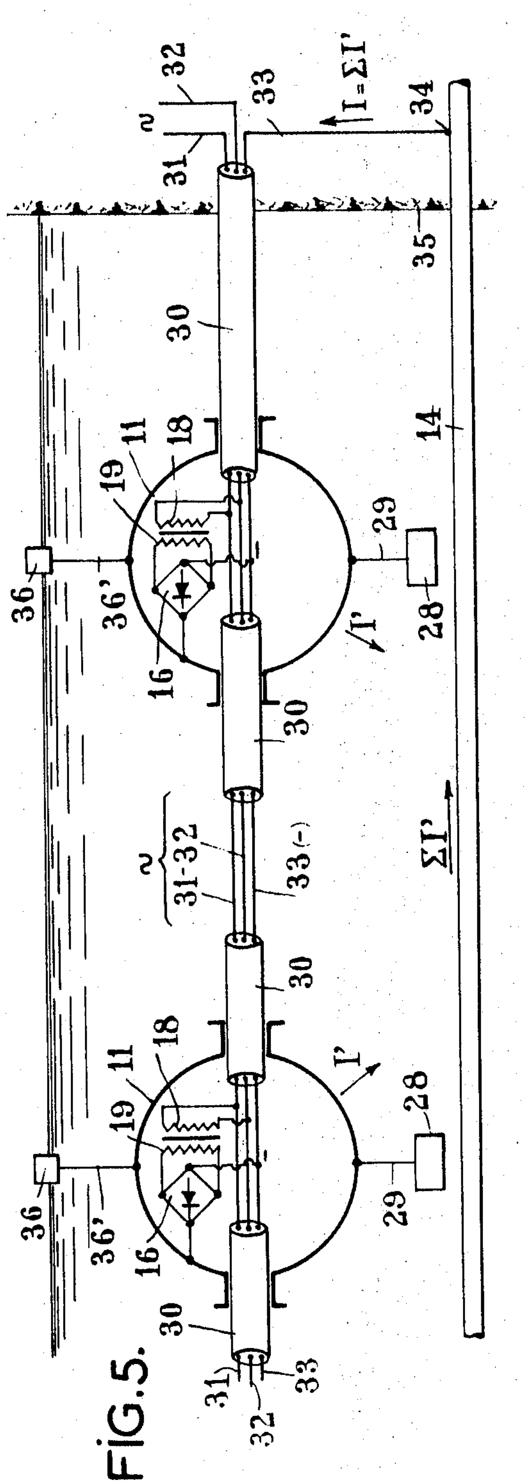
FIG. 5 illustrates diagrammatically a device according to this invention, wherein the negative terminals (−) of the elementary current sources are connected in parallel through a so-called "negative long line" conductor grounded at the initial or shore end of the structure.

In FIG. 5 there is shown an alternate cathode protection device according to this invention which consists of an indetermined number of buoys 11 interconnected by an insulated electric cable or a plurality of insulated cables 30 containing three conductors 31, 32, 33. This example illustrates the supply of single-phase alternating current through two conductors 31, 32 and the parallel connection through the long line 33 of the negative terminals of the D.C. sources 16 enclosed in the buoys 11. This long line grounded at the end of the piping to be protected is thus disposed electrically in series with the structure to be subjected to a cathode protection.

Still by way of example, this form of embodiment comprises the sources 16 of protection current and the transformers 18 and 19. The negative long line 33 is grounded to the piping at a single point 34 collecting the whole of the protection current $I=\Sigma I'$, wherein I' is the output of each buoy 11.

The buoys 11 constitute themselves the junction boxes for the conductor 30 for it is clear that this technological arrangement cannot be economically adequate unless the cross-sectional area of the return cable 33 decreases towards the open sea, with a maximum cross-section at the shores 35.

In the above-described arrangements the buoys 11 may be either immersed or laid on the bottom, or adapted to act as signal buoys, their construction being immaterial.

In the first case the buoys 11 are if desired provided with mushroom-anchors 28 provided with a wire rope or a train 29. In the example illustrated in FIG. 5 this solution facilitates the dragging of the chain for maintenance purposes; in this last instance the axis of the chain as laid may not be parallel to the piping to be protected. The dragging may be facilitated by the provision of a signal or beacon buoy as shown at 36 in FIG. 5, this signal or beacon buoy being retained by ropes 36'.

The specific arrangement described with reference to FIG. 5 calls for various remarks.

Thus, on the one hand, the negative connection called "negative long line" may consist of a relatively thick steel rope or a steel pipe insulated from the sea water, at least in the vicinity of the buoys 11.

Figure 5A:
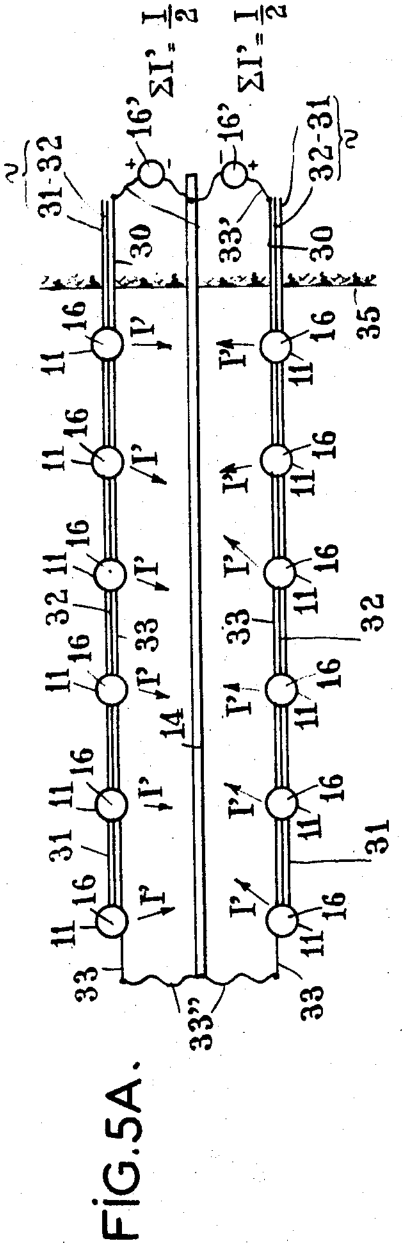
FIG. 5A illustrates diagrammatically a modified form of embodiment of the same device.

On the other hand, the "negative long line" may be connected to the piping or piping system to be protected at either ends or at different points of the structure, as shown by way of example at 33', 33'' in FIG. 5A.

Finally, one or more additional D.C. sources 16', disposed in the loop or loops 33', 33'' connecting the ends of the "negative long line" to the ends of the structure to be protected may be adapted to facilitate the action of the protection current; these reinforcing sources are of the booster type and have their positive terminal (+) connected to the aforesaid "negative long line," and their negative terminal (−) connected to the piping. A similar effect having the same purpose may be obtained, i.e. facilitating the passage of current, by providing in each buoy an elementary D.C. source of which the voltage across the terminals would increase with the distance from the shore, as the length of the buoy-supporting chain increases from the shore outwards.

FIG. 5A also shows that a plurality of chains may be provided for protecting a same structure.

Figure 6:
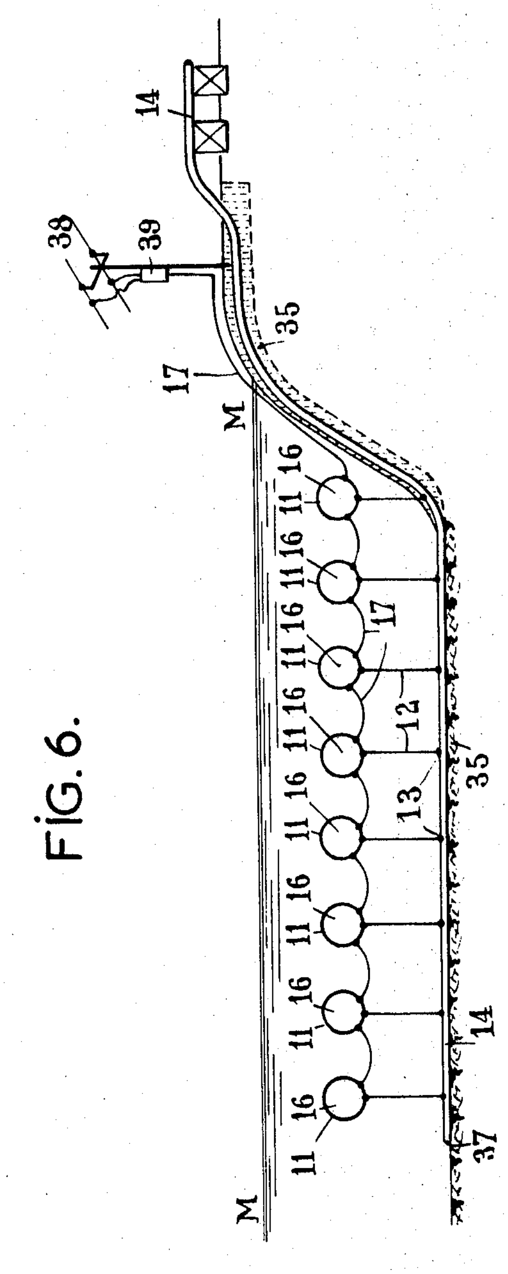
FIG. 6 illustrates diagrammatically the cathode protection, by means of "buoys" of a piping leading to an underwater location.

FIG. 6 illustrates by way of example the arrangement of FIG. 2 as applied to a conduit 14 having its outer or terminal end underwater, as at 37. The arrangements illustrated in FIGS. 3, 4 and 5 are also applicable in this case; the sea bottom is designated by the reference numeral 35 and the sea level by the letters MM.

The single-phase alternating current feeding the protection D.C. sources 16 disposed within the buoys 11 is cited by way of example only as a technologically possible alternative. This current is fed through an overhead or underground line 38 leading to the line 17 energizing the buoys through the medium of a junction or connecting box 39 containing a voltage transformer, if necessary.

Figures 7, 8:
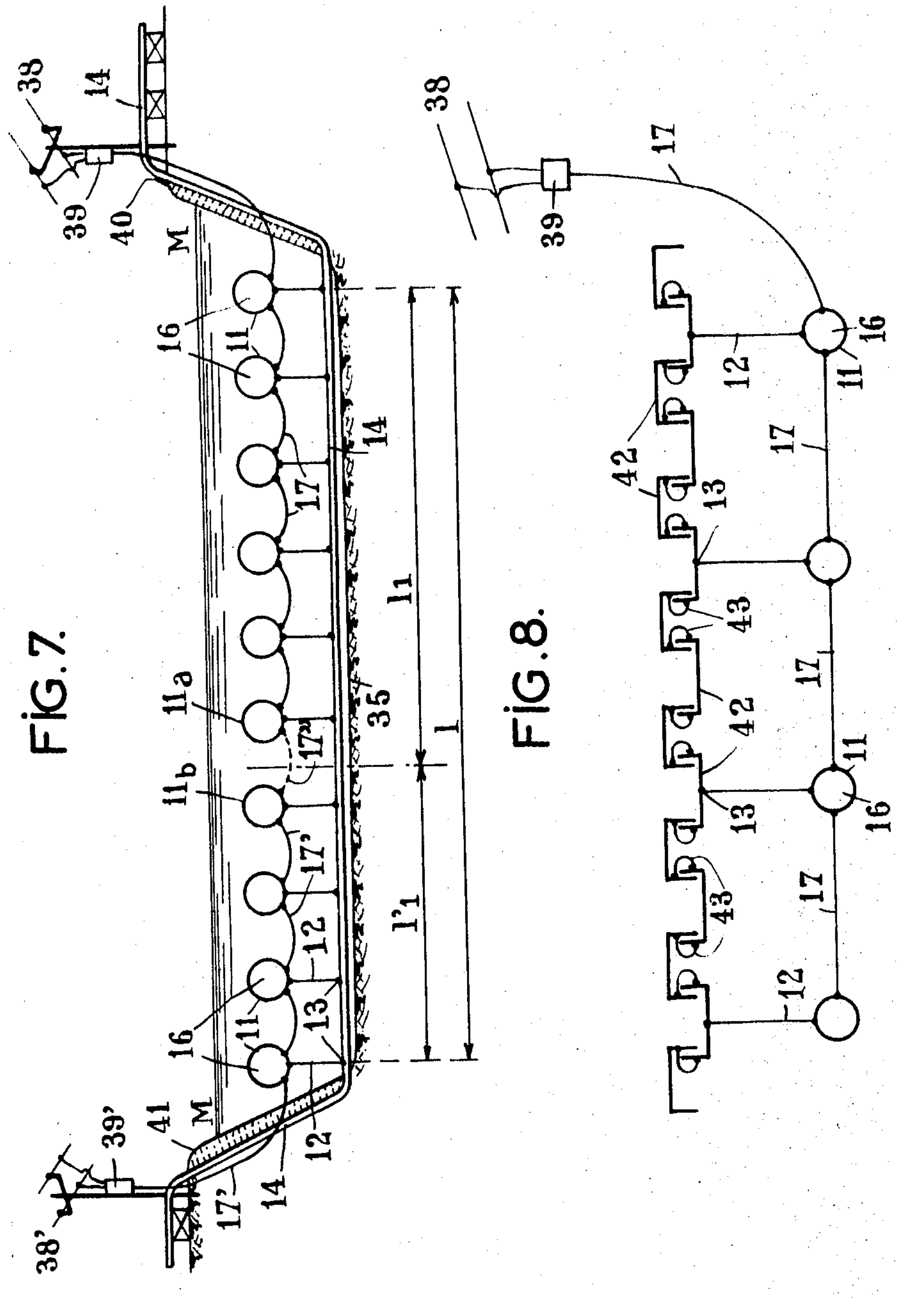
FIG. 7 shows the cathode protection by means of "buoys" of a piping interconnecting two banks or shores, or an isle to a continent, or a piping laid across a water stream or an arm of the sea.
FIG. 8 shows the cathode protection, by means of a buoy system, wherein each buoy constitutes an elementary source of current for protecting a structure such as a set of pile-planks, lock gates, canal locks, etc.

FIG. 7 illustrates by way of example the arrangement of FIG. 2 applicable to a piping 14 leading to two shores 40 and 41.

From the first shore 40 the buoys 41 are supplied with current from the mains 38 through the junction box 39.

From the opposite shore 41 to line 17' passing through the buoys 11' is fed from the mains 38' through a junction box 39'.

With this arrangement the cathode protection may be obtained by utilizing two different feed circuits 38 and 38'. Each circuit is associated with a specific section $l'_I$ or $l_I$ of the piping ,these sections being equal or not in in length.

In fact, lines 17 and 17' are independent and therefore the circuit is broken between buoys $\mathbf{11_a}$ and $\mathbf{11_b}$.

In case the two circuits 38 and 38' were synchronous the connection 17'' disposed between buoys $\mathbf{11_a}$ and $\mathbf{11_b}$ will restore the continuity of conductor 17.

In FIG. 8, the pile structure 42 to be protected from corrosion comprises elements interconnected by fishplates 43 to ensure the electrical continuity of the structure. A supply line 17 starting from connection 39 with the mains 38 feeds in parallel the elementary D.C. sources 16 enclosed in the buoys 11. The arrangement shown in this FIG. 8 is very similar to the one shown in FIG. 2.

In the foregoing (FIGS. 1 to 8 inclusive) the electrical conductors interconnecting the buoys (irrespective of the specific purpose of this connection) are adapted to float in mid-water, or lay on the bottom, or alternately be fastened to the structure to be protected, or penetrate into the piping and emerge therefrom through adequate gland-packings at suitable locations.

In FIG. 9, the buoy-type cathode protection system is shown as applied to structures such as piers or breakwaters supported by sheet piles driven into the sea bottom.

By way of example, the pier consists of a platform 44, supported by sheet piles 45 driven through the sea bottom, the assembly being welded to ensure its electrical continuity.

An alternating-current line 38 shown in this example as a single-phase line is provided along the entire structure.

Associated with each buoy 11 is a connecting box 39 permitting the connection of the separate supply lines 17 of said buoys 11. These conductors 17 penetrate into the buoys 11 by means of gland-packings 20 (see FIG. 9A). Each buoy has the same conventional internal arrangement comprising for instance a rectifier 16, and a transformer 18, 19.

The positive terminal (+) of the rectifier is connected to the ground of the discharge buoy and the negative terminal (−) is connected to an insulated or bare conductor 12 permitting the connection of the negative terminal (−) of the current source to the structure to be protected and also the mechanical suspension of the buoy 11 from this structure 44. The negative connection is designated by the reference numeral 13.

A mushroom-rope 28 and a buoy-rope 29 may be provided, if desired, for holding the buoy in position. The gland-packings 20 (on the supply side) and 15 (for the negative connection) permit the ingress of the conductors into the water-tight buoys 11 (see FIG. 9A).

The buoy (see FIG. 9B) is disposed symmetrically in relation to the piles but any other suitable distribution or arrangement may be contemplated, for example with buoys 11'' (negative connections 12'') along the axis of two even and odd piles.

In FIGS. 10A, 10B, 10C and 10D there is shown diagrammatically in the form of spherical bodies and by way of example four types of buoys corresponding to the arrangement illustrated in FIG. 2.

As already explained, these buoys are spherical and consist of two half-spheres to facilitate the mounting of the internal current sources and connections. The watertightness is obtained by means of a circular gasket and the assembly is closed by means of stainless bolts or by welding, if necessary.

As in the preceding examples, the D.C. source 16, the transformer 18, 19, the gland-packagings 20, 21, 15, the negative connection 12, etc., are also incorporated in this device.

In FIG. 10A, one or both halves consist for example of aluminium-stabilized titanium alloy forming a surface capable of emitting current indefinitely towards the sea water and the structure to be protected without undergoing any appreciable deterioration, this current having a density of 1 to 3 amperes per square meter of surface area, and a potential difference across the source terminals of the order of 5 to 8 or 9 volts. Thus, the buoy proper constitutes the discharge member of the system.

In FIG. 10B, which corresponds to the general description of the buoy, there is added to the outer surface of one or both half-spheres of ordinary titanium or of anodically stainless metal or alloy, or of aluminium titanium alloy, a spherical cap 111 or an equivalent structure having a spherical shape or consisting of spherical segments, made of platinised titanium or a treated or untreated metal, capable of emitting a high density of direct current without undergoing an appreciable deterioration in time, for example 500 to 700 A./sq. m. in the case of platinised titanium.

Physically, under these conditions, the discharge member consists simply of the conducting portion of the buoy. However, in the specific case of the platinising of one fraction or the whole of a buoy consisting of aluminium titanium the lack of platinum coating will not prevent the buoy from operating. When the conducting layer has disappeared, the emission of current will continue by reason of 1 to 3 A./sq. m., as if the buoy has been constructed according to the teachings of FIG. 10A.

In FIG. 10C, which also corresponds to the general structure illustrated in FIG. 10A, an easily replaceable projection 112, for example a titanium tube having a platinised outer surface, is fastened to the buoy 11.

The discharge tube 112 may be secured to the upper portion of the buoy so as to be easily reached by the divers or when dragging the buoys.

If desired, the negative connection 12 may also be caused to emerge from within the platinized tube 113. In this case the buoy 11 is made water-tight both by the gland-packing 46 and by the gland-packing 15 disposed in this case within the buoy 11. In FIG. 10D a discharge member 114 consisting of an anode, for example of silicon cast-iron, secured to one end of a cable, will be associated with the buoy.

These technologically possible arrangements are given by way of example only and should not be construed as limiting the scope of the invention.

FIG. 11 shows a buoy 11 of any configuration, made of any material, also of non-conducting material which has secured thereto through any suitable means unitary discharge members 48, 49, 50 independent of one another when starting the operation of the system (as in the case of FIGS. 10B, 10C and 10D). These discharge members 48, 49 and 50 are insulated from one another and also from the wall 11 of the buoy by means of an insulating coating 47.

Assuming that the discharge member 48, for example of platinized titanium, is worn, that is, has lost its platinum coating, the voltage across the terminals of source 16 will increase, the output decreasing as the platinum coating wears out. Under these conditions, for a given degree of wear, the resistant coil 51 itself will be capable of closing the contact 52 which is held in its closed position and the discharge member 49 will become operative. As this member becomes worn in turn, the coil 53 will close the contact 54 which, after being locked, will cause the operation of discharge member 50.

Thus, buoys of which the access were difficult or even definitely precluded can be operated during a very long time. The arrangement shown in FIG. 11 is also applicable to the structures shown in FIGS. 2, 3 and 4.

The buoys illustrated in the preceding figures are mainly spherical, but this convenient and specific shape is given by way of example only.

In FIG. 12, a buoy of cylindrical configuration is shown also by way of example.

This buoy enclosing in the manner already set forth the elementary source of protection current is fastened to a float utilized when laying the piping. The connection between the buoy and the float is also conducting, whereby these two elements act jointly and simultaneously as the discharge member of the cathode protection system.

It is known that a float line is frequently used for assisting in the operation consisting in laying a piping launched initially from the shore or bank. These floats keep the piping immersed a few yards below the water level before the final operation consisting in laying the piping on the sea bottom.

To sink the piping, a valve is opened on the float remotest from the shore in order to release the air contained in the float, the water penetrating through a hole provided to this end. Thus the piping is slowly sunk, and the vent holes of the floats are opened in succession in the direction towards the shore.

On the other hand, it is shown that if for example the bare or uncoated or unplated metal is caused to contact sea water, a complete cathode immunity of this bare metal against corrosion requires 120 ma./sq.m. in calm water, and that the same metal, after silting (which occurs after a few months' immersion) requires only 60 ma./sq.m. to ensure a perfect protection.

Under these conditions, when starting the actual service of an underwater system, for example a piping system, an excess cathode polarization must be applied to the metal, which consists in causing the current sources to deliver an output considerably higher than the normal or service output, the ratio being of the order of 2 to 1. Thus, substantial time savings are made in relation to the time necessary to allow the so-called "safety" alkaline boundary layer to develop (a few days) as contrasted with the several months necessary for building up this layer with only a normal output from the onset.

The technological form of embodiment illustrated in FIGS. 12A to 12F inclusive will automatically supply, from the very beginning of the cathode protection operation, an output considerably higher than the normal protection output, the latter being gradually established.

In these figures the launching float system is combined with the protection buoy system.

Figures 12A, 12B, 12C, 12D, 12E, 12F:
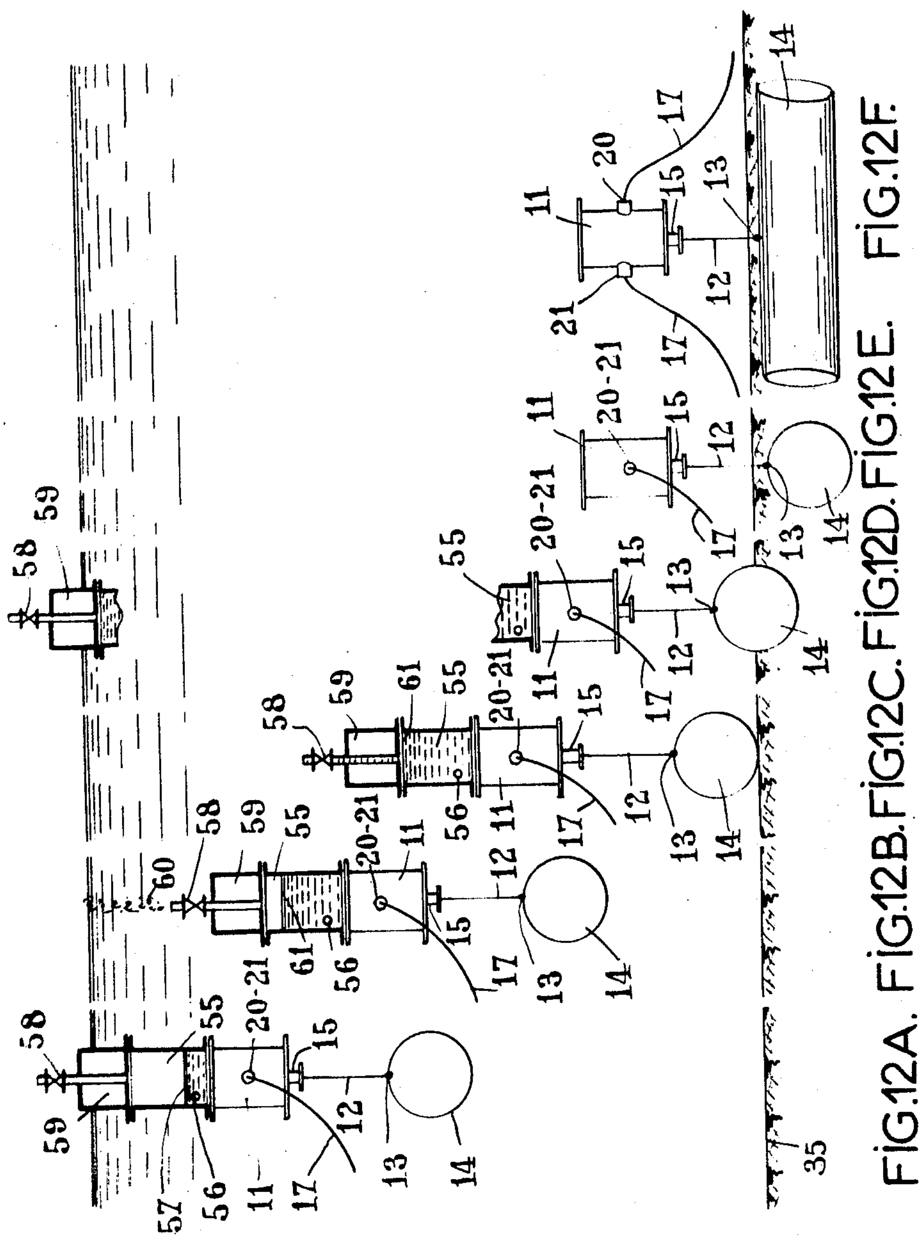

FIG. 12F shows the position of the piping after the sinking thereof in the first sand or silt layer of the sea bottom, to illustrate the cathode protection technique of which the principle is illustrated in FIG. 2.

FIGS. 12A, 12B, 12C, 12D and 12E illustrate the various phases of the piping immersion.

In FIG. 12A, the piping 14 is immersed in midwater; it is suspended at 13 (negative connection) from a rope 12 which actually consists of an insulated conductor penetrating through a gland-packing 15 into the protection buoy 11 of the type described hereinabove and illustrated in a different shape in FIG. 2. This water-tight buoy 11 is sufficient to support the rope 12.

Another buoy or launching float 55 is fastened by adequate mechanical means to the buoy 11 and capable of supporting the piping. This float has a hole 56 formed in its wall to permit the access of sea water to the inside, but the level 57 of this water remains very low due to the compression of the air trapped therein, the top valve 58 being closed.

A pipe connects the float 55 to the valve 58 through an upper or top float 59 sufficient to compensate the weight of float 55.

These floats 55 and 59 are assembled by means of flanges and are preferably electrically insulated from each other.

FIG. 12B shows the beginning of the immersion of the piping 14. The valve 58 is open, air escapes from the valve 58 as shown by the bubbles 60, the sea water rises in float 55 to level 61.

In FIG. 12C the piping 14 has reached the bottom 35, float 55 is filled with water but the rope 12 is still taut due to the "displacement" of the buoy and to the fact that the weight of the walls of float 55 is compensated by the upper or top float 59.

In FIG. 12D the piping 14 begins to sink in the silt or sand, the cathode protection having been started before by energizing the cable 17.

The discharge member of the system comprises on the one hand the buoy 11 and on the other hand the steel float 55. The float 59 insulated from float 55 does not emit any current.

Therefore, the complete discharge system has a particularly great surface area and the emission of protection current may be considerably higher during this laying period than that required for normal service conditions, until the so-called "electrolytic allocorrosion" has vanished.

The float 59 is released from the underlying float 55 as the latter gradually disintegrates, as a consequence of the slow corrosion of a thinner wall portion provided to this end. FIG. 12E illustrates the final evolution of this condition, so that only the discharge member 11 consisting of the buoy proper remains in service.

FIG. 12F illustrates in elevational view the final condition; when the piping has been silted completely, the protection current has assumed its normal voltage value.

To sum up, with this specific device there is available, during the piping laying period, a discharge member characterized by a considerable surface area and a relatively high protection output, whereby an alkaline protection film is rapidly formed on the surface to be protected. When this protection film has been formed completely, the current output necessary for maintaining same may be reduced to a considerable extent. This current output reduction takes place automatically upon removal, by corrosion, of the float 55. The moment at which the normal current output is to take place may be predetermined with a sufficient precision by forming in the float 55 an adequate thinner or weaker section preferentially attacked by the corrosive medium.

In all the above description it is assumed that the chain or series or line of buoys 11 may either rest on the sea bottom, or be immersed at any desired level, or constitute a visible beacon line equipped or not with sound or light signals, according to specific requirements. This last alternative is advantageous in that it affords an easy access to the buoys.

Alternatively, the protection buoys 11 may be simply anchored to the buoys used for launching the immersed piping. This connection is of mechanical order. Thus, the buoy-pipe connecting the launching buoy to the piping will act as a negative connecting line 12 after the immersion of the structure. In this case, the launching buoy will also be subjected to an efficient cathode protection when the piping or like structure has been immersed.

FIG. 13 illustrates the addition of a remote-measuring circuit to the feed cables or "negative long line" conductors, for controlling from the shore the complete piping system; of course, this example is given by way of illustration and should not be construed as limiting the present invention.

In this case, special conductors adjacent to the connecting lines (as shown by way of example in FIG. 13) may be used, but it would not constitute a departure from the basic principle of this invention to utilize the feed cables and/or the "negative long line" conductors themselves for transmitting the measurement signals.

This remote measuring circuit system may be used for measuring the operation of the sources of protection current and/or the reduction in the output voltage at any point along the piping.

In this respect, FIG. 13 (which shows a circuitry corresponding, by way of example, to the arrangement of FIG. 2) illustrates a conventional-type buoy 11 containing a source 16 of protection current (rectifier) and the transformer 18, 19. The buoy 11 also acts as a junction box for the measuring conductors.

A six-wire cable emerges through the gland-packing 20 from the buoy 11; it comprises two wires 17 for the single-phase current fed to the current source 16 mounted in the buoy 11, and four wires 62, 63, 68, 69, all these wires being enclosed in a common sheath 64. Conductors 62 and 63 may be used for controlling for example a physical, electrical or electro-chemical value.

Through the other gland-packing 15 emerges the negative connection 12 leading at 13 to the piping 14 and a pair of the wires 62, 63 enclosed for example in a sheath **64*b*, one of these wires, for instance wire 63, leading to a reference electrode 65 disposed in close vicinity of the piping, the other wire 62 being connected to the piping at 66**.

Thus, the potential difference ($V_{65}-V_{66}$) is measured to ascertain the efficiency of the cathode protection, at a point 66 spaced from connection 13. A junction box 67 may be used for greater convenience.

From the gland-packing 20 emerge six wires leading to the shore, it being understood that this number may vary according to requirements. In this case, two conductors 17 may be used for supplying alternating current to the D.C. current source 16, two conductors 68, 69 from the downstream direction and two conductors 62, 63 from the buoy 11, all these wires being enclosed in a common sheath 64.

Four wires enclosed in a sheath **64*a* emerge from gland-packaing 21 and three wires enclosed in another sheath 64*b* emerge from the other gland-packing 15**. In the case illustrated in the diagram only one remote-measuring station is provided.

FIG. 14 illustrate diagrammatically another arrangement of the remote-measuring wires.

Referring again by way of example to the arrangement of FIG. 2, it may be assumed that the piping 14 is substantially equipotential and under these conditions the reference electrodes 70, 71, 72 and 80 are suspended respectively by means of conductors 73, 74, 75 and 79 from junction boxes 76, 77, 78, 81 mounted on the cable interconnecting the buoys $11_a$, $11_b$, $11_c$ and $11_d$.

The cable disposed between $11_a$ and 76 emerges from buoy $11_a$ and comprises the pair of conductors 17, 17 for supplying alternating current to the D.C. sources 16 enclosed in the buoys (for example a single-phase supply) with an additional conductor 79 leading to a reference electrode 80 (junction box 81) totalling three conductors. It is assumed that bouy $11_a$ is the penultimate one of the complete chain.

The connecting cable disposed between 76, $11_b$ and 77 comprises four conductors, including the conductor 73 connecting the reference electrode 70, etc.

The cable from $11_d$ and leading to the shore will thus comprise six conductors, that is, the pair of conductors 17, 17 of the single-phase supply line and four conductors 73, 74, 75 and 79 for controlling the reference electrodes.

Under these conditions, on shore the arrangement shown in FIG. 15 corresponds to the control device of FIG. 14.

The piping 14 on shore is connected at 82 to the negative terminal (—) of a voltmeter having a high coil resistance, the positive terminal of this voltmeter being connected in succession through a switch 84 to the ends of wires 73, 74, 75 and 79.

Thus, the potential reduction in the piping at the most unfavorable points, equally spaced from a pair of adjacent buoys, is measured.

If the degree of cathode protection is not deemed sufficient the voltage across the terminals of conductors 17, 17 and therefore the protection output, may be increased to the desired value by resorting to an autotransformer 85 connected to the general mains circuit 38.

It will be noted that in all the cases described hereinabove the conductors leading to a buoy and connecting same to the adjacent buoys may be either separated from each other or in contrast thereto enclosed in a common sheath or a plurality of insulated sheath. Under certain conditions, the insulation of the conductors constituting the negative connections of the system may, if desired, be dispensed with.

The relative spacing of the buoys containing the elementary sources of protection current may be as reduced as possible; thus, the cathode protection of bare immersed surfaces (i.e. without coats of paint or plating) may be considered as a normal result even in the case of a relatively long piping system, the protection chain being as long as the structure to be protected.

In the foregoing the protection buoy 11 is connected through a negative conductor 12 to the structure to be protected.

FIG. 16 illustrates the manner in which the source of protection current may be incorporated in the structure proper, as an alternative, notably in the case of an immersed piping system in which this solution is particularly advantageous.

In this case the alternating current supply cable 17 runs along the piping 14. This cable 17 (carrying single-phase current in this example) is secured to the piping 14 by any suitable fastening means 86 (shown in chain-dotted lines in the drawing) providing a complete protection; this cable 17 penetrates into the sleeve or tube 11 through a gland-packing 20, and emerges therefrom through another gland-packing 21.

The sleeve 11 contains the conventional transformer 18, 19 and the rectifier 16. It may consist of a simple tube 11 concentric to a piping section 98 and secured thereto by means of end flanges 87 and sockets 88 welded on the one hand to the sleeve 11 and on the other hand to the piping section 98 after having mounted therein the component elements of the source of protection current, i.e., the cable 17, transformer 18, 19, rectifier 16, and cable 89, the latter emerging from the sleeve 11 through another gland-packing 90.

The piping section 98 proper may be disposed by welding same to adjacent sections of the piping 14, and under these conditions the piping system may be laid complete with its built-in cathode protection.

Due to the specific arrangement of the protection source the discharge member 95 must be capable of "floating" above the piping or like structure so that the electrical field will have a sufficient range. Therefore, the discharge element will be carried by a buoy 94 keeping this element above the piping. The electric cable 89 holding the discharge member may thus comprise a positive conductor 9 feeding the discharge member and a negative cable 92 ensuring a cathode protection of the buoy supporting the discharge member. To this end, an ohmic resistance 93 limits the protection current of this equipment.

FIG. 17 illustrates the provisional assembly of the sleeve 11 with the buoy 94 carrying the discharge member 95.

The cable 89 is connected through its positive conductor 91 to the discharge member 95 and through its negative conductor 92 to the earth or ground of buoy 94.

A nylon connection 96 (or any other suitable connection) keeps the buoy 94 clamped against the sleeve 11. A steel hook, stretching-screw or like member 97 constitutes the clamping member. This hook or stretching device 97 is electrically connected through a conductor 98 to a point 99 of the discharge member 95, whereby after a short time the hook or stretching device 97 will be broken by anode corrosion when the protection device is put in service. Thus, the buoy is released.

After releasing the buoy the final position of the discharge member 95 with respect to piping 14 will be that shown diagrammatically in FIG. 18.

By disposing four conductors 17 on piping 14, four different protection lines may be supplied with current:

Line 1 feeding buoys 1 $(1+2n)$ $(1+3n)$ etc.
Line 2 feeding buoys 2 $(2+2n)$ $(2+3n)$ etc.
Line 3 feeding buoys 3 $(3+2n)$ $(3+3n)$ etc.
Line 4 feeding buoys 4 $(4+2n)$ $(4+3n)$ etc.

Thus, assuming that $d$ is the useful life of a discharge member, the total service time of the four chains used in succession or alternatively will be $4.d$.

The form of embodiment of the present invention which is illustrated in FIG. 19 corresponds to the structure illustrated in FIG. 16. However, the conductors 17, 17' supplying alternating current to the D.C. sources run along the piping 14 and are secured thereto by any suitable mechanical means 86 (shown in chain-dotted lines) ensuring their complete protection. The elementary direct-current source is housed in the water-tight enclosure 110 consisting of a sleeve assembled with the immersed piping 14 by means of transverse welded plates 87. Thus, the sleeve provides with the outer wall of piping 14 a cylindrical space in which the various component elements of the elementary source of direct current are mounted.

The supply conductors 17, 17' extend from end to end through this water-tight chamber or enclosure 110 by means of tubes 101 and 102 respectively, open at either ends and welded in a water-tight and stress-resisting manner to the end plates 87. The conductors 17 and 17' are thus safely isolated from the interior of chamber 110. On the tubes 101 and 102 a plurality of magnetic tores 103 and 104 carrying coils 105 and 106 are fitted, as shown. These coiled tores actually act as current transformers. The terminals of coils 105 carried by tores 103 are connected in parallel through a pair of conductors 107 and 108 to the terminals of the primary winding 109$a$ of a transformer 109. The secondary winding 109$b$ of this transformer 109 is connected to a rectifier 120 mounted as a two-way device as permitted by the low secondary voltage flowing therethrough, this arrangement constituting of course a mere example not precluding other alternatives within the skill of those conversant with the art.

Similarly, the ends of coils 106 carried by the other magnetic tores 104 are connected in parallel through a pair of conductors 111 and 112 to the primary winding 113$a$ of a transformer 113 having its secondary winding 113$b$ connected to a rectifier 114 also mounted as a two-way device. The positive terminals (+) of rectifiers 120 and 114 are connected through water-tight connectors 90 and 90A to a discharge or output device, not shown, and the negative terminals (−) of these rectifiers are connected to the earth or mass of enclosure 110 and therefore to the general ground of piping 14.

In the case of a single-phase piping, two separate discharge or output devices may be contemplated, which are connected through water-tight connecting devices 90, 90$a$ to the positive terminals (+) of rectifiers 120 and 114.

In the case of a three-phase supply the three supply conductors pass through three tubes similar to the tubes 101 and 102 extending from end to end through the water-tight chamber 110. The D.C. source comprises three transformer-rectifier assemblies similar to the assemblies 109–120 and 113–114 described hereinabove, and the three positive terminals (+) of these assemblies may be connected respectively and separately to three separate discharge or output members.

The lead-in and lead-out devices for conductors 17 and 17' which have just been described in the case of elementary current sources incorporated in the immersed structure are also applicable to other forms of embodiment of this invention described in the foregoing, notably if these D.C. sources are housed in water-tight buoys connected at spaced intervals to the immersed structure either directly or through a "negative long line." In all cases each conductor of the supply line (whether single-phase or three-phase) extends through the buoy containing the component elements of the D.C. source, by means of a tube welded in a water-tight manner to the buoy wall and carrying in said buoy a plurality of coiled magnetic tores connected to a transformer-rectifier assembly.

The cathode protection cell associated with an immersed structure or piping as shown in FIG. 21 comprises an elementary source of direct current which is housed in the chamber formed by a sleeve 110 rigid with a pair of annular outer flanges 121 and 122 having their central apertures closed by the end inner flanges 123 and 124 rigidly secured to the outer flanges 121 and 122 by means of a suitable insulating cement or glue 125 such as the one known under the trade name of "Araldite," thus providing an electrical insulation between the end flanges 123, 124 and the outer flanges 121 and 122.

The conductor 17' of the A.C. supply line extends through a tube 126 having its ends welded to the end flanges 123 and 124. The other A.C. supply conductor 17 extends through another pair of tubes 127 and 128 welded to the end flanges 123 and 124 and is coiled in order to provide one or a plurality of loops 129. Under these conditions, the A.C. supply line consisting of these conductors 17 and 17' is insulated without any discontinuity from end to end.

Coiled magnetic tores 131 and 132 are disposed respectively outside the tubes 127 and 128. These tores actually act as current transformers connected to rectifiers 133 and 134 respectively delivering the rectified cathode protection current.

In the alternate form of embodiment illustrated in FIG. 21 the sleeve 110 is connected to the positive output terminals of rectifiers 133 and 134, and the negative terminals of these rectifiers are connected in common to the end flanges 123 and 124 insulated from sleeve 110 by means of cement joints 125. Therefore, the sleeve 110 is the positive terminal of the cathode protection cell and constitutes by itself the discharge or output member of the system. It consists preferably of a titanium-aluminum alloy, or platinized titanium.

According to an alternate form of embodiment, the sleeve 110 may be connected through a conductor 135 (shown in chain-dotted lines in FIG. 21) to a conventional separate discharge or output member.

The end flange 124 constituting the negative terminal of the protection cell is either connected to the piping to be protected by means of a connecting member 126, or welded directly to this piping.

Relay cells 140 comprising each a transformer 137 (of which the windings **137*a* and 137*b* are formed directly with the supply wires 17 and 17' to avoid and discontinuity in the insulation) are inserted in the supply lines 17, 17' penetrating into the relay cell 140 through tubes 138 open at their ends and closed by gland-packings 139. The internal space 141 of this relay cell 140** is filled with an insulating material, preferably the aforesaid product "Araldite," like all the other cells.

A wire 142 interconnects the various cells to provide the electrical and mechanical continuity of the system of which all the steel components (such as flanges, ropes, etc.) are safely protected by the cathode current.

In FIG. 22 there is illustrated diagrammatically one fraction of a cathode protection chain associated with an immersed piping in case the length of this piping were less than about 20 miles, the immersion depth inferior to 130 feet and the piping diameter about 30 inches or 750 mm. In this figure, as well as in the other figure, the current paths are shown by arrows. The cathode protection line and the piping to be protected are parallel and spaced from 50 to 100 meters from each other. In this case the piping 14 is firstly immersed separately and the protection line is subsequently immersed. Divers will then release from the piping 14 the negative half-connection 143 and connect same to the negative half-connection 144 welded in turn to the negative terminals of a pair of adjacent protection cells 145 and 146. The assembly is obtained by using bolts engaging flanges **143*a* and 144*a* provided at the ends of the aforesaid half-connections 143 and 144**.

It will be noted that the elementary sources of direct current of cells 145 and 146 comprise a single set of magnetic tores 131 surrounding the tube 127 in cell 145, or tube 126 in cell 146. The central tube 128 may be dispensed with coiled magnetic tores and in this case it is used only for forming the turns of conductor 17 in cell 145, and those of conductor 17' in cell 146.

The cathode protection line partially illustrated in FIG. 23 is adapted to be associated with a piping immersed at a relatively great depth, of the order of 130 to 2,000 feet, the length of this piping being if desired very great (of the order of 100 km. or 60 miles), the piping diameter being for example of the order of 30 inches or 750 mm. In this case the cathode protection line is an integral part of the immersed piping 14. The protection cells 151 and 152 similar to the cells 145 and 146 of FIG. 22 are welded to the piping 14. All the electrical components of the elementary D.C. source are housed in the free space available between the outer wall of piping 14 and the sleeve 110 of each cell, this sleeve consisting preferably of titanium. A titanium wire 135 welded to the sleeve 110 (positive terminal) leads to a floating discharge member 11 (for example in the form of a platinised titanium sphere) overlying the piping 14, the latter being connected to the negative terminals of the various elementary D.C. sources.

FIGS. 24 and 24A illustrate the wiring diagram of a cathode protection arrangement in case the structure 14 to be protected were immersed at a relatively great depth (of the order of 130 to 2,000 feet), this piping having a relatively reduced length (less than 10 miles) and being less than ten inches in diameter.

In this type of cathode protection system a complete independence between the piping 14 and the protection line is obtained, a feature particularly valuable in case of a rapidly sinking bottom preventing the divers from operating.

The cathode protection line consists of protection cells 157, 158, 159, . . . consisting each of a pair of adjacent elementary cells such as the pair of elementary cells 145 and 147, similar to those illustrated in FIG. 22, with the interposition of boosters 153, 154, 155 . . . and transformer relays 165, etc. . . .

At the shore end A of piping 14 a current $I=n.i$ amperes must be tapped, $n$ being the number of protection cells in service which emit each a $i$-ampere current.

To tap this current I the first booster 153 (on the shore) should have the following partial characteristics:

$$\text{output}=I$$

amperes, voltage across terminals $\frac{1}{2}r.I$, $r$ being the longitudinal resistance of the tube.

To bring this current I at the input end of the first protection cell 157 the booster 153 should have the following final characteristics: output=$I$ amperes, voltage across terminals $\frac{1}{2}(r+r')I$, $r'$ being the longitudinal resistance of the connection between the booster 153 and the first cell 157.

In the negative long line 22 for returning the protection current in elements 153, 157, 158, 159 . . . the following voltage drops are obtained between the successive existing cells: 157, 158, 159, . . . :

between 157 and 158 $=(I-i)r''=V_1$
between 158 and 159 $=(I-2i)r''=V_2$ wherein $i$ is the output of each source and $r''$ the resistance of the negative long line 22 between two adjacent protection cells. To reduce the voltages $V_1, V_2 \ldots V_{n-1}$ to zero, boosters such as 154, 155 . . . are associated with the cells and connected in series along the line. The other portions of the protection line are like those described in the above disclosure.

What I claim is:

1. A cathode device for protecting immersed metallic structures such as piers, pipings and conduits against corrosion which comprises a single source of A.C. current, a series of elementary sources of protection direct current fed in parallel from said single A.C. current, water-tight immersed enclosures each enclosing one of said elementary sources of protection direct current, the outer wall of each enclosure constituting the discharge member emitting the protection current, conductors for connecting said single A.C. current source to said elementary direct-current sources in said enclosure and negative connection for protecting said structure which penetrates into said enclosures and has its outer end connected to said structure.

2. A cathode protection device for immersed structures as set forth in claim 1, wherein said water-tight immersed enclosures are kept at the desired level and are disposed at spaced intervals along at least part of the length of said structure, and wherein said direct-current sources consist essentially of current rectifiers.

3. A device as set forth in claim 1 further comprising an insulated single-phase or multi-phase cable leading from a shore or from a floating or pile-supported platform and having lead-in portions penetrating into said enclosures and lead-out portions emerging therefrom through gland-packings for supplying alternating current to said protection direct-current sources housed in said enclosures.

4. A device as set forth in claim 1 wherein each enclosure constitutes by itself the discharge member adapted to emit protection direct-current towards the immersed structure to be protected against corrosion, said member being connected within said enclosure to the positive terminal of the D.C. source of which the negative terminal is connected to the structure to be protected against corrosion, all the negative terminals of the series of sources of protection direct current being thus connected in parallel due to the continuity of the structure to be protected.

5. A device as set forth in claim 1 wherein each negative cable connecting in parallel the negative terminals of the D.C. source is connected by a conductor emerging from a junction box to the structure to be protected, the aforesaid negative connection being a negative long line type and being connected to said structure between two adjacent enclosures, the negative terminals of the protection line being connected in parallel both by the continuity of said structure and by said negative long line.

6. A device as set forth in claim 5 wherein said negative terminals of said D.C. sources enclosed in said enclosures are connected in parallel both by said negative long line connected to the structure to be protected and directly to said structure through corresponding negative connections.

7. A cathode protection device applicable to immersed metallic structures such as underwater electric conduits, which comprises an insulated current conductor, a series of elementary protection direct-current sources fed in parallel from said conductor, a water-tight immersed enclosure for housing each elementary current source, a discharge member capable of emitting said protection direct-current consisting of the outer wall of said enclosure, lead-in and lead-out insulating gland-packings for said conductor in each enclosure whereby each enclosure constitutes a junction box, connections inside each enclosure which lead to the negative terminal of each elementary protection D.C. source, a negative long line conductor connected to said structure, and an overvoltage source inserted in the circuit between said negative long line and said structure.

8. A cathode protection device applicable to immersed metallic structures as set forth in claim 7 further comprising ropes for suspending each enclosure, said ropes being connected on the one hand to the negative terminal of said protection D.C. source enclosed in said enclosure and on the other hand to the ground of said structure, and a current line disposed along said structure and provided with branch lines leading into said enclosure for supplying A.C. current to said source of direct current.

9. A cathode protection device applicable to immersed metallic structures which comprises a single source of A.C. current, an insulated single-phase or multiphase supply conductor connected to said source of A.C. current, a series of elementary protection D.C. sources fed in parallel from said single source of current, a water-tight enclosure containing each elementary D.C. source and acting as a discharge member adapted to emit the protection direct current, said enclosure being electrically and mechanically connected to the immersed structure to be protected, a tube open at each end and welded in a water-tight manner to said enclosure, said A.C. supply conductor passing through said tubes, each enclosure further containing at least one current transformer, and a transformer-rectifier unit constituting the elementary direct-current source mounted in said enclosure externally of each tube.

10. A cathode protection device applicable to immersed metallic structures as set forth in claim 9 further comprising a plurality of magnetic tores carrying corresponding coils which surround each tube receiving therein an A.C. supply conductor, the windings of said tores being connected in parallel to the primary winding of a transformer having its secondary winding connected to a rectifier having in turn its positive terminals connected to a common discharge member.

11. A cathode protection device applicable to immersed metallic structures which comprises a single source of A.C. current, A.C. supply conductors connected to said source of A.C. current, a series of elementary protection D.C. sources fed in parallel from said single A.C. source, an enclosure containing each elementary protection D.C. source, first and second parallel tubes extending in a water-tight manner through said enclosure and receiving said A.C. supply conductors therethrough, each one of said supply conductors forming one or several turns in said first and second parallel tubes, and at least one current transformer connected to a rectifier also housed in said enclosure.

12. A cathode protection device for immersed structures as set forth in claim 11 wherein said first and second parallel tubes are disposed by pairs and have coiled therein one of said supply conductors to constitute one or several turns each carrying a set of magnetic tores formed with coil windings, each one of the units thus formed being connected to rectifiers having their positive terminals connected to a lateral wall of the water-tight enclosure containing said elementary D.C. source.

13. A cathode protection device for immersed structures as set forth in claim 11 wherein said first and second parallel tubes are disposed by pairs and have coiled therein one of said supply conductors to constitute one or several turns each carrying a set of magnetic tores formed with coil windings connected in parallel, each set of magnetic tores having a rectifier connected in parallel between a lateral wall of said water-tight enclosure and at least one end flange of the enclosure which is electrically insulated therefrom.

14. A cathode protection device for immersed structures as set forth in claim 1 wherein each water-tight enclosure comprises a sleeve member constituting a vertical wall of said enclosure, a pair of transverse end flanges, means for assembling said sleeve and flanges, and means for electrically connecting said flanges to the negative terminal of each D.C. source.

References Cited

UNITED STATES PATENTS

| | | | |
|---|---|---|---|
| 1,962,696 | 6/1934 | Rhodes | 204—196 |
| 2,700,649 | 1/1955 | Hosford | 204—196 |

FOREIGN PATENTS

| | | | |
|---|---|---|---|
| 867,277 | 5/1961 | Great Britain. | |

TA-HSUNG TUNG, Primary Examiner